US012181825B2

(12) United States Patent
Shingai et al.

(10) Patent No.: US 12,181,825 B2
(45) Date of Patent: Dec. 31, 2024

(54) PRINTER

(71) Applicant: BROTHER KOGYO KABUSHIKI KAISHA, Nagoya (JP)

(72) Inventors: Hiroyuki Shingai, Nagoya (JP); Shohei Ichikawa, Niwa (JP); Kazutoshi Nakamura, Kuwana (JP); Shota Shinoya, Nisshin (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 198 days.

(21) Appl. No.: 17/584,560

(22) Filed: Jan. 26, 2022

(65) Prior Publication Data

US 2022/0146976 A1 May 12, 2022

Related U.S. Application Data

(63) Continuation of application No. PCT/JP2020/023179, filed on Jun. 12, 2020.

(30) Foreign Application Priority Data

Jul. 30, 2019 (JP) ................................ 2019-140213

(51) Int. Cl.
*B41J 2/175* (2006.01)
*B41J 13/00* (2006.01)
(Continued)

(52) U.S. Cl.
CPC ........ *G03G 15/6579* (2013.01); *B41J 2/1752* (2013.01); *B41J 13/0018* (2013.01);
(Continued)

(58) Field of Classification Search
CPC .......... G03G 21/1604; G03G 21/1609; G03G 15/6573; G03G 2215/00421;
(Continued)

(56) References Cited

U.S. PATENT DOCUMENTS 5,729,785 A 3/1998 Sakaizawa et al.
6,690,901 B2 * 2/2004 Katsuyama ........ H04N 1/00525 399/107
(Continued)

FOREIGN PATENT DOCUMENTS

JP 7-117280 A 5/1995
JP 7-276782 A 10/1995
(Continued)

OTHER PUBLICATIONS

International Search Report issued in corresponding International Patent Application No. PCT/JP2020/023179, dated Sep. 1, 2021.
(Continued)

*Primary Examiner* — Jennifer Bahls
(74) *Attorney, Agent, or Firm* — Merchant & Gould P.C.

(57) ABSTRACT

A printer includes an image forming unit configured to form an image on a sheet by an electrophotographic method, and a recording unit configured to record an image on a sheet by an inkjet method. An image recording position of the recording unit is located above an image forming position of the image forming unit.

32 Claims, 20 Drawing Sheets

(51) Int. Cl.

| | |
|---|---|
| ***G03G 15/00*** | (2006.01) |
| ***G03G 21/16*** | (2006.01) |
| ***G03G 21/18*** | (2006.01) |
| *B41J 2/21* | (2006.01) |

(52) U.S. Cl.
CPC ..... *G03G 15/6573* (2013.01); *G03G 21/1633* (2013.01); *G03G 21/1839* (2013.01); *B41J 2/2103* (2013.01); *G03G 2215/00421* (2013.01); *G03G 2215/0043* (2013.01); *G03G 2221/183* (2013.01)

(58) Field of Classification Search
CPC ....... G03G 15/6579; G03G 2215/0043; G03G 21/1839; G03G 21/1633; G03G 2221/183; B41J 3/546; B41J 2/1752; B41J 2/2103; B41J 13/0018
See application file for complete search history.

(56) References Cited

U.S. PATENT DOCUMENTS

| | | | | |
|---|---|---|---|---|
| 2003/0063912 | A1 | 4/2003 | Miyazaki et al. | |
| 2003/0076518 | A1* | 4/2003 | Miyake | H04N 1/387 358/1.9 |
| 2008/0316245 | A1 | 12/2008 | You et al. | |
| 2016/0124370 | A1* | 5/2016 | Miwa | G03G 15/234 399/405 |
| 2018/0088498 | A1* | 3/2018 | Honda | G03G 21/1633 |
| 2023/0176514 | A1* | 6/2023 | Itabashi | G03G 21/1867 399/38 |

FOREIGN PATENT DOCUMENTS

| | | | | |
|---|---|---|---|---|
| JP | 8-160693 | A | | 6/1996 |
| JP | 8-286451 | A | | 11/1996 |
| JP | 9-204116 | A | | 8/1997 |
| JP | 2001-80132 | A | | 3/2001 |
| JP | 2002-301838 | A | | 10/2002 |
| JP | 2011-90266 | A | | 5/2011 |
| JP | 2011093132 | A | * | 5/2011 |
| JP | 2013-103457 | A | | 5/2013 |

OTHER PUBLICATIONS

International Preliminary Report on Patentability and Written Opinion of the International Searching Authority issued in corresponding International Patent Application No. PCT/JP2020/023179, dated Feb. 10, 2022.
Office Action issued in corresponding Chinese application 202080054503.0, Sep. 27, 2023.
Office Action issued in the corresponding Chinese Patent Application No. 202080054503.0, Apr. 3, 2024.

* cited by examiner

PRINTER

CROSS-REFERENCE TO RELATED APPLICATION

This is a continuation application of International Application No. PCT/JP2020/023179 filed on Jun. 12, 2020 which claims priority from Japanese Patent Application No. 2019-140213 filed on Jul. 30, 2019. The entire contents of the earlier applications are incorporated herein by reference.

BACKGROUND

The present disclosure relates to a printer.

A printer is known in the related art. The printer includes an image forming unit configured to form an image on a sheet by an electrophotographic method and a recording unit configured to record an image on a sheet by an inkjet method.

In a printer including an electrophotographic image forming unit and an inkjet recording unit, when a black and white image is formed on a sheet, the image forming unit may form an image at high speed, and the recording unit may record a color image on a sheet as necessary.

In this manner, the printer disclosed in the related art may form a black and white image on a sheet and record a color image on a sheet by a single printer.

In the printer disclosed in the related art, since the electrophotographic image forming unit and the inkjet recording unit are arranged side by side in a horizontal direction, a size of the printer in the horizontal direction is increased.

The present disclosure provides a printer that includes the electrophotographic image forming unit and the inkjet recording unit and that may be downsized in the horizontal direction.

SUMMARY

According to an aspect of the invention, a printer includes an image forming unit configured to form an image on a sheet by an electrophotographic method, and a recording unit configured to record an image on a sheet by an inkjet method. An image recording position of the recording unit is located above an image forming position of the image forming unit.

In this manner, since the image recording position of the recording unit is located above the image forming position of the image forming unit, the size of the printer in the horizontal direction may be reduced.

DETAILED DESCRIPTION

Next, embodiments of the present disclosure will be described with reference to the accompanying drawings.

Configuration of Printer

Figure 1:
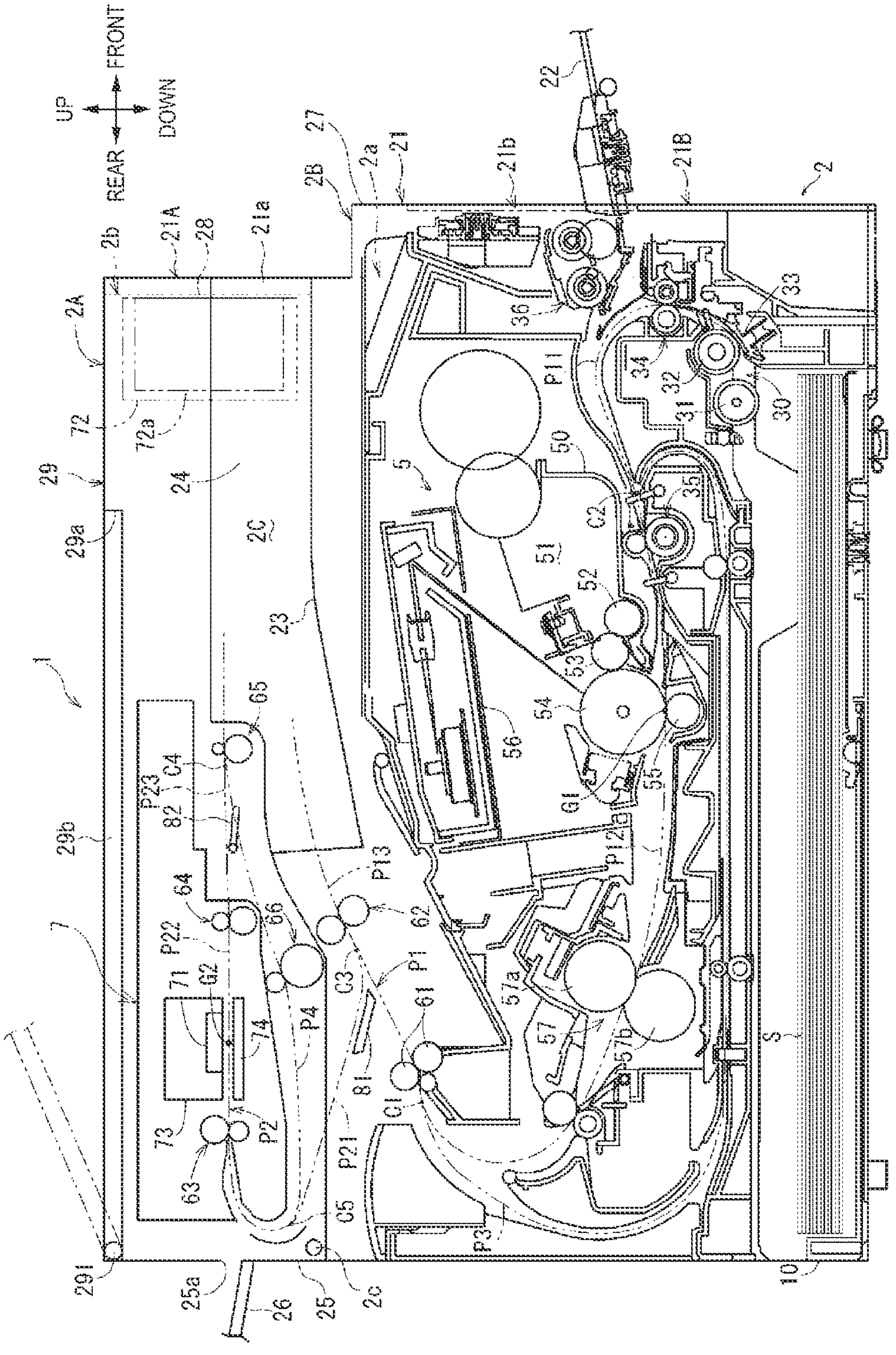
FIG. 1 is a central cross-sectional view showing a printer.
Figure 2:
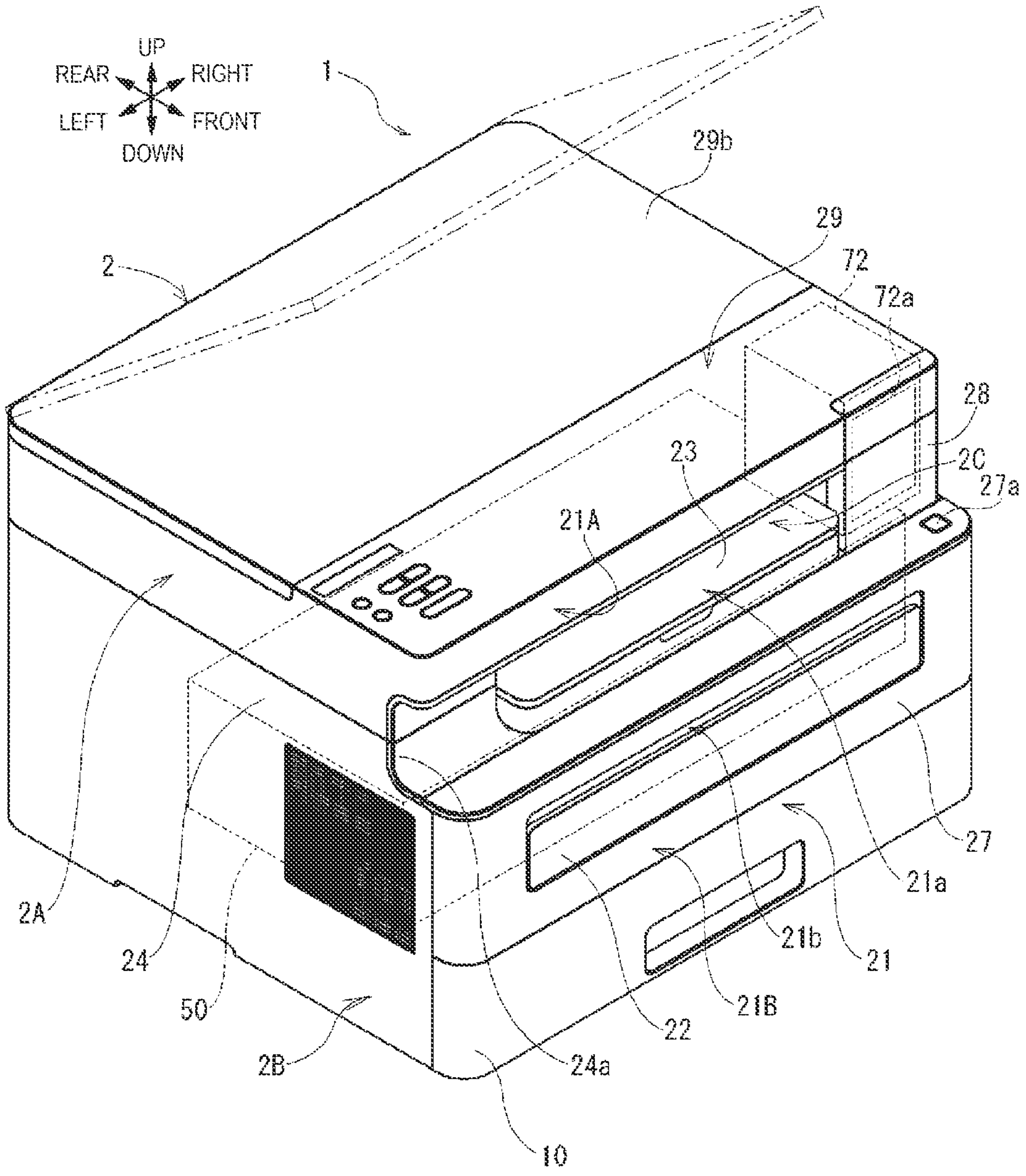
FIG. 2 is a perspective view showing the printer as viewed obliquely from the front left.
Figure 3:
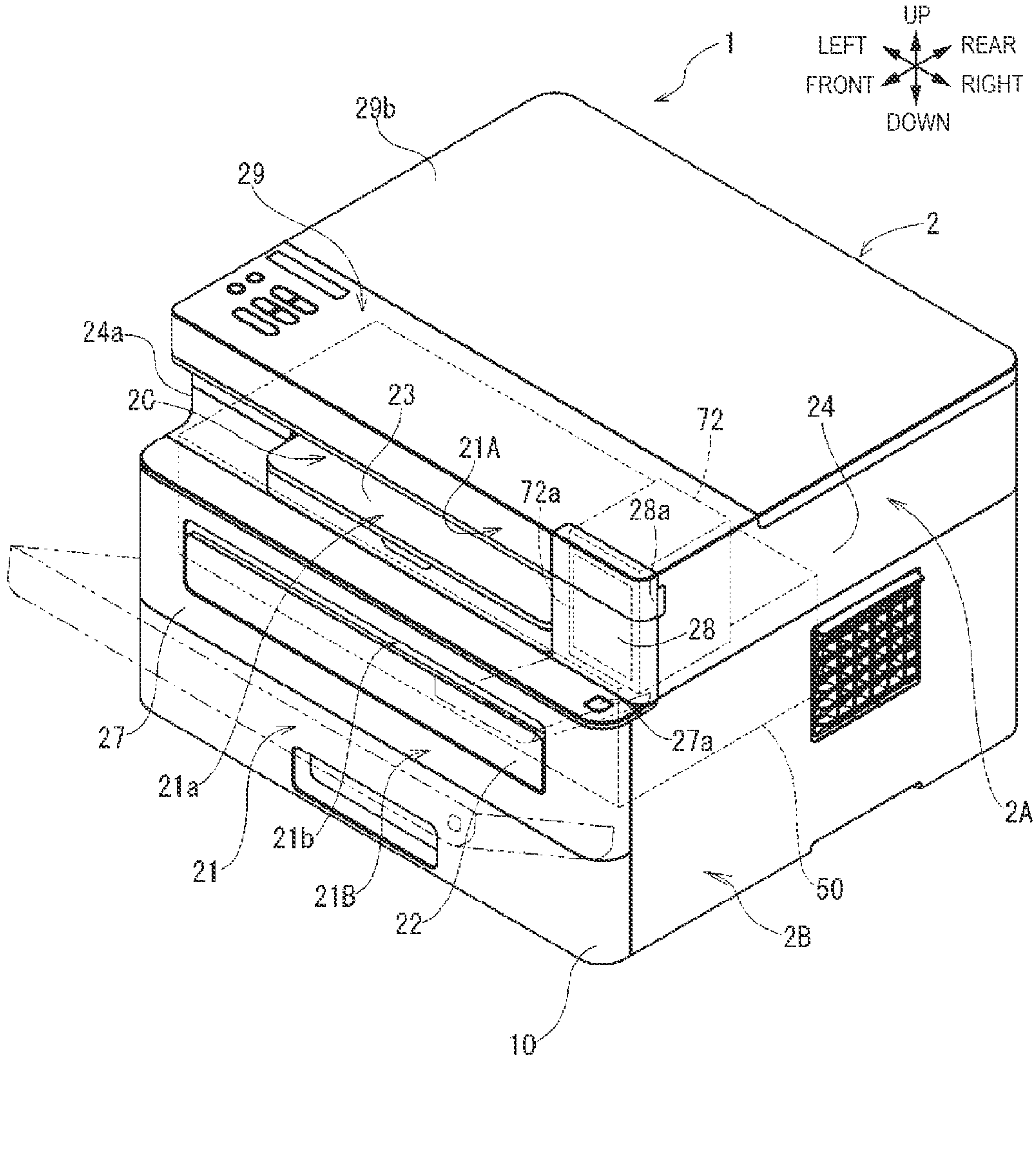
FIG. 3 is a perspective view showing the printer as viewed obliquely from the front right.
Figure 4:
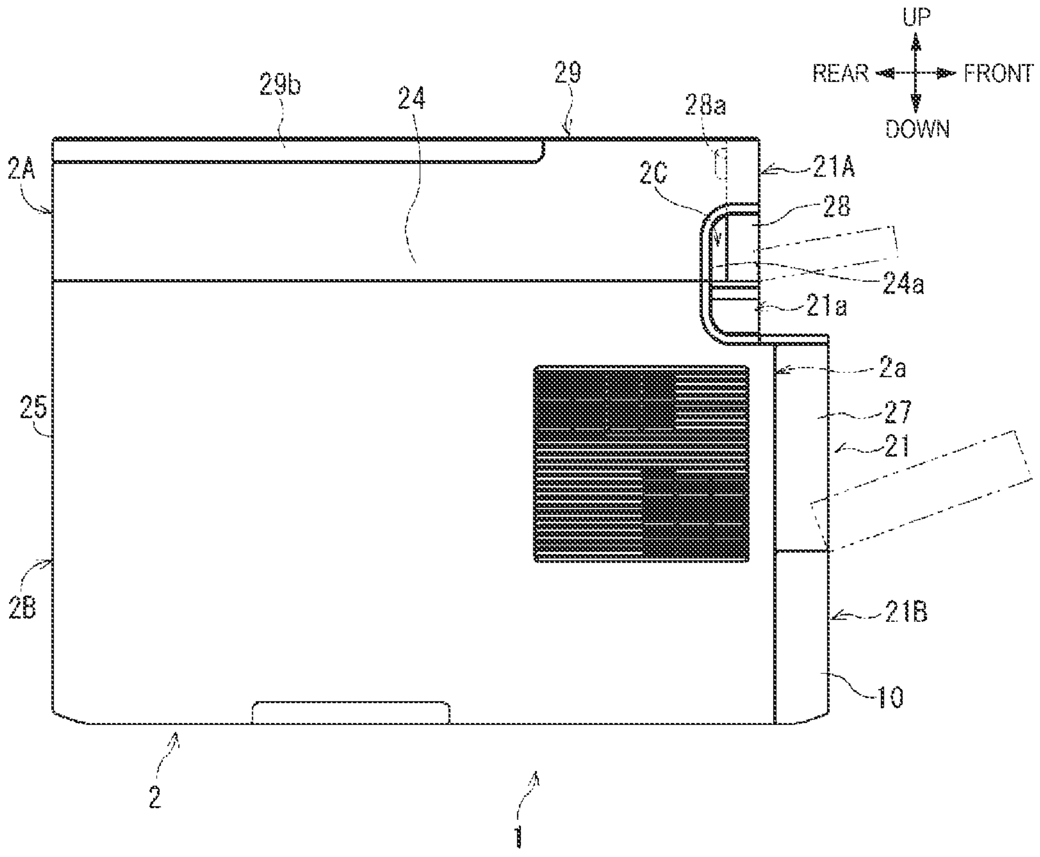
FIG. 4 is a left side view showing the printer.

A printer 1 shown in FIG. 1 to FIG. 4 according to an embodiment of the present disclosure includes a housing 2, an image forming unit 5, a recording unit 7, and a sheet cassette 10. In the following description, a right side in FIG. 1 is defined as a front side of the printer 1, a left side in FIG. 1 is defined as a rear side of the printer 1, a near side in FIG. 1 is defined as a left side of the printer 1, and a far side in FIG. 1 is defined as a right side of the printer 1. An upper-lower direction in FIG. 1 is defined as an upper-lower direction of the printer 1.

The image forming unit 5 forms an image on a sheet S at an image forming position G1 by an electrophotographic method. The recording unit 7 records an image on a sheet S at an image recording position G2 by an inkjet method. The housing 2 houses the image forming unit 5 and the recording unit 7. In the printer 1, it is possible to perform one or both of image formation by the image forming unit 5 and image recording by the recording unit 7 on the sheet S.

The housing 2 is a box body formed into a substantially rectangular parallelepiped shape, and includes a first housing 2A and a second housing 2B disposed below the first housing 2A. The first housing 2A houses the recording unit 7, and the second housing 2B houses the image forming unit 5. The image recording position G2 where an image is recorded on the sheet S by the recording unit 7 housed in the first housing 2A is located above the image forming position G1 where an image is formed on the sheet S by the image forming unit 5 housed in the second housing 2B.

The housing 2 has a discharge space 2C. The discharge space 2C is formed between the first housing 2A and the second housing 2B in the upper-lower direction. A first front opening 21*a* is formed in a front face 21 of the housing 2. The first front opening 21*a* is an example of an opening provided in a front face of a housing. The discharge space 2C is opened to the outside of the housing 2 through the first opening 21. A discharge tray 23 that defines a lower side of the discharge space 2C is formed below the discharge space 2C.

A second front opening 21*b* is opened below the first front opening 21*a* in the front face 21 of the housing 2. The housing 2 has a first sheet tray 22 that may open and close the second front opening 21*b*. The second front opening 21*b* and the first sheet tray 22 are disposed in the second housing 2B.

The first sheet tray 22 may be moved between an open posture in which the second front opening 21*b* is opened and a close posture in which the second front opening 21*b* is closed. The first sheet tray 22 may support the sheet S supplied to the image forming position G1 of the image forming unit 5 when the first sheet tray 22 is in the open posture.

The first sheet tray 22 is disposed at a front side portion that is one side portion of the housing 2 in a front-rear direction.

A sheet cassette 10 is disposed at a lower portion of the second housing 2B. The sheet cassette 10 may contain a plurality of sheets in a stacked state. The sheet cassette 10 is an example of a sheet tray that holds sheets. The printer 1 includes a first sheet feeding unit 30 that feeds a sheet S contained in the sheet cassette 10 toward the image forming unit 5. The first sheet feeding unit 30 is disposed at a front end portion of the sheet cassette 10, and includes a first sheet feeding roller 31, a separation roller 32, and a separation pad 33.

The image forming unit 5 is disposed above the sheet cassette 10 in the first housing 2A. The printer 1 has a first path P1 extending from the sheet cassette 10, passing through the image forming unit 5, and extending to the discharge tray 23. The first path P1 includes a first sheet feeding path P11 for feeding the sheet S from the sheet cassette 10 to the image forming unit 5, a first conveyance path P12 for conveying the sheet S in the image forming unit 5, and a first discharge path P13 for discharging the sheet S from the image forming unit 5 to the discharge tray 23.

The first sheet feeding path P11 extends forward and upward from the sheet cassette 10, then is curved into a U shape, and extends rearward. The first conveyance path P12 is formed to be continuous with the first sheet feeding path P1, and extends rearward. The first discharge path P13 is formed to be continuous with the first conveyance path P12, extends rearward and upward, then is curved into a U shape, extends forward and upward, and extends to the discharge tray 23.

The sheets S supported by the sheet cassette 10 are fed in succession to the separation roller 32 by the first sheet feeding roller 31, and are separated one by one by the separation roller 32 and the separation pad 33 and are fed to the first sheet feeding path P11. A first conveyance roller pair 34 is disposed downstream of the separation roller 32 in the conveyance direction of the sheet S on the first sheet feeding path P11, and the sheets S that were separated one by one are conveyed toward the first conveyance roller pair 34 along the first sheet feeding path P11.

A registration roller pair 35 is disposed downstream of the first conveyance roller pair 34 in the conveyance direction on the first sheet feeding path P11, and the sheet S conveyed to the first conveyance roller pair 34 is conveyed toward the registration roller pair 35 by the first conveyance roller pair 34. The sheet S conveyed to the registration roller pair 35 is conveyed toward the image forming unit 5 by the registration roller pair 35. The registration roller pair 35 restricts a movement of a leading end of the sheet S to be conveyed and stops the sheet S, and thereafter, the sheet S is conveyed toward the image forming unit 5 at a predetermined timing.

The image forming unit 5 is disposed downstream of the first sheet feeding unit 30 in the conveyance direction of the sheet S. The image forming unit 5 forms an image on the sheet S conveyed along the first conveyance path P12 of the first path P1. The image forming unit 5 includes a process cartridge 50 that transfers an image to a surface of the sheet S conveyed to the image forming unit 5, an exposure unit 56 that exposes a surface of a photosensitive drum 54 provided in the process cartridge 50, and a fixing unit 57 that fixes the image transferred to the sheet S by the process cartridge 50.

The process cartridge 50 is disposed above the first conveyance path P12 of the first path P1, and includes a toner containing chamber 51, a feed roller 52, a developing roller 53, the photosensitive drum 54, a transfer roller 55, and the like. The toner containing chamber 51 is an example of a toner containing portion that contains toner.

The exposure unit 56 includes a laser diode, a polygon mirror, a lens, a reflector, and the like, and exposes the surface of the photosensitive drum 54 by irradiating the photosensitive drum 54 with laser light based on image data input into the printer 1.

Toner serving as a developer is contained in the toner containing chamber 51. The toner contained in the toner containing chamber 51 is conveyed to the feed roller 52 while being stirred by a stirring member (not shown).

The feed roller 52 further supplies the toner sent from the toner containing chamber 51 to the developing roller 53.

The developing roller 53 is disposed in close contact with the feed roller 52, and carries toner that is supplied from the feed roller 52 and is positively charged by a sliding contact member (not shown). A positive developing bias is applied to the developing roller 53 by a bias applying unit (not shown).

The photosensitive drum 54 is disposed adjacent to the developing roller 53. A surface of the photosensitive drum 54 is positively charged by a charger (not shown) and then is exposed by the exposure unit 56. An exposed portion of the photosensitive drum 54 has a lower potential than the other portions, and an electrostatic latent image based on the image data is formed on the photosensitive drum 54.

Then, the positively charged toner is supplied from the developing roller 53 to the surface of the photosensitive drum 54 on which the electrostatic latent image is formed, so that the electrostatic latent image is visualized and is formed into a toner image.

The transfer roller 55 is disposed in a manner of facing the photosensitive drum 54, and a negative transfer bias is applied to the transfer roller 55 by a bias applying unit (not shown). The sheet S nipped between the photosensitive drum 54 on which the toner image is formed and the transfer roller 55 whose surface is subjected to the transfer bias is conveyed along the first conveyance path P12, so that the toner image formed on the surface of the photosensitive drum 54 is transferred to a surface of the sheet S. A position of the surface of the sheet S where the toner image on the photosensitive drum 54 is transferred to the surface of the sheet S on the first conveyance path P12 is an image forming position G1 where the image forming unit 5 forms an image on the sheet S.

The fixing unit 57 includes a heating roller 57*a* and a pressurizing roller 57*b*. The heating roller 57*a* is rotationally driven by a driving force from a drive source provided in the printer 1, and is heated by the power supply from a power source provided in the printer 1. The pressurizing roller 57*b* is disposed in a manner of facing the heating roller 57*a*, and is driven to rotate to be in close contact with the heating roller 57*a*. When the sheet S to which the toner image was transferred is conveyed to the fixing unit 57, the sheet S is conveyed while being nipped by the heating roller 57*a* and the pressurizing roller 57*b*, and the toner image is fixed to the sheet S.

The printer 1 includes a first discharge roller pair 61 and a first reverse roller pair 62 disposed on the first discharge path P13 of the first path P1. The first discharge roller pair 61 and the first reverse roller pair 62 are disposed downstream of the image forming unit 5 in the conveyance direction on the first path P1. On the first path P1, the first reverse roller pair 62 is disposed downstream of the first discharge roller pair 61 in the conveyance direction of the sheet S.

The sheet S conveyed from the fixing unit 57 is conveyed toward the discharge tray 23 along the first discharge path P13 by the first discharge roller pair 61 and the first reverse roller pair 62. The sheet S conveyed along the first discharge path P13 is discharged to the discharge tray 23 by the first reverse roller pair 62. The sheet S on which an image is formed by the image forming unit 5 and that is conveyed along the first path P1 is conveyed along the first path P1 at a constant speed.

The first discharge roller pair 61 and the first reverse roller pair 62 may be driven by a drive source (not shown) provided in the printer 1. The first discharge roller pair 61 may convey the sheet S to a downstream side in the conveyance direction along the first path P1. The first reverse roller pair 62 may reverse a rotation direction, may convey the sheet S to the downstream side in the conveyance direction along the first path P1, and may convey the sheet S to an upstream side in the conveyance direction along the first path P1. The first reverse roller pair 62 is disposed downstream of the image forming unit in the conveyance direction on the first path, and is an example of a reverse roller that may convey a sheet to the downstream side in the conveyance direction and may convey a sheet to the upstream side in the conveyance direction.

The first sheet feeding path P11 of the first path P1 is a path arranged between the sheet cassette 10 and the registration roller pair 35, the first conveyance path P12 of the first path P1 is a path arranged between the registration roller pair 35 and the fixing unit 57, and the first discharge path P13 of the first path P1 is a path arranged between the fixing unit 57 and the discharge tray 23.

The printer 1 includes a sheet feeding mechanism 36 that feeds a sheet S supported by the first sheet tray 22 toward the registration roller pair 35. The sheet S fed from the first sheet tray 22 to the registration roller pair 35 by the sheet feeding mechanism 36 is conveyed to the first conveyance path P12 by the registration roller pair 35, a toner image is transferred by the photosensitive drum 54, and the transferred toner image is fixed by the fixing unit 57. Thereafter, the sheet S is conveyed along the first discharge path P13 by the first discharge roller pair 61 and the first reverse roller pair 62, and is discharged to the discharge tray 23.

The printer 1 includes a return path P3 for returning the sheet S conveyed to the upstream side in the conveyance direction by the first reverse roller pair 62 to a position upstream of the image forming position G1 of the image forming unit 5 in the conveyance direction. One end of the return path P3 is connected to the first path P1 at a connection position C1 between the fixing unit 57 and the first discharge roller pair 61 on the first discharge path P13. That is, the first path P1 is connected to the return path P3 between the image forming unit 5 and the first reverse roller pair 62 in the conveyance direction of the sheet S. The other end of the return path P3 is connected to the first path P1 at a connection position C2 between the first conveyance roller pair 34 and the registration roller pair 35 on the first sheet feeding path P11.

The recording unit 7 includes a recording head 71 that ejects ink onto a sheet S, an ink containing chamber 72 that contains ink to be supplied to the recording head 71, a carriage 73 that supports the recording head 71 in a manner of being movable in a left-right direction, and a platen 74 that is disposed in a manner of facing the recording head 71. The recording head 71, the carriage 73, and the platen 74 are disposed at a rear side of an upper portion of the housing 2, and the ink containing chamber 72 is disposed at a front side of the upper portion of the housing 2.

The printer 1 includes a second path P2 that is a branch from the first discharge path P13 of the first path P1, that passes through the recording head 71, and that extends to the discharge tray 23. The second path P2 is connected to the first path P1 at a connection position C3 between the first discharge roller pair 61 and the first reverse roller pair 62 on the first discharge path P13. That is, the first path P1 is connected to the second path P2 between the image forming unit 5 and the first reverse roller pair 62 in the conveyance direction of the sheet S.

The sheet S is conveyed to the downstream side in the conveyance direction and then is conveyed to the upstream side in the conveyance direction by the first reverse roller pair 62 along the first discharge path P13 of the first path P1, and the sheet S is guided to the second path P2. The sheet S guided to the second path P2 is conveyed along the second path P2 from the connection position C3, passes through the image recording position G2, and is conveyed toward the discharge tray 23.

The printer 1 includes a second conveyance roller pair 63 disposed upstream of the recording head 71 in the conveyance direction of the sheet S on the second path P2, a second discharge roller pair 64 disposed downstream of the recording head 71 in the conveyance direction of the sheet S on the second path P2, and a second reverse roller pair 65 disposed downstream of the second discharge roller pair 64 in the conveyance direction of the sheet S on the second path P2.

The second conveyance roller pair 63 is a roller that conveys, toward the recording head 71, the sheet S supplied from the connection position C3 to the second path P2. The recording head 71 ejects ink onto the sheet S conveyed by the second conveyance roller pair 63 so as to record an image on the sheet S. That is, the recording unit 7 records an image on the sheet S conveyed along the second path P2, and a position where the ink is ejected from the recording head 71 onto the sheet S is the image recording position G2 where the recording unit 7 records an image on the sheet S. The image recording position G2 of the recording unit 7 is located at a rear portion of the housing 2 in the front-rear direction.

The second path P2 includes a curved path P21 for conveying the sheet S from the connection position C3 toward the recording head 71, a second conveyance path P22 along which the sheet S is conveyed between the second conveyance roller pair 63 and the second discharge roller pair 64, and a second discharge path P23 for discharging the sheet S that passed through the recording head 71 to the discharge tray 23.

The curved path P21 is a path disposed between the connecting position C3 and the second conveyance roller pair 63. The curved path P21 extends rearward and upward from the connection position C3, then is curved into a U shape, and extends forward toward the image recording position G2 of the recording unit 7. The second conveyance path P22 is a path that is continuous with the curved path P21 and is disposed between the second conveyance roller pair 63 and the second discharge roller pair 64. The second conveyance path P22 extends forward from the second conveyance roller pair 63 toward the second discharge roller pair 64. The second discharge path P23 is formed to be continuous with the second conveyance path P22, and extends forward from the second discharge roller pair 64.

As described above, since the curved path P21 is curved into a U shape from the connection position C3 with the first path P1 toward the image recording position G2 of the recording unit 7, it is possible to reduce a size of the second conveyance path P22 of the printer 1 in the front-rear direction which is the conveyance direction of the sheet S.

The second conveyance path P22 is disposed between the recording head 71 and the platen 74 in the upper-lower direction, and the platen 74 supports the sheet S conveyed along the second conveyance path P22 from below. The recording head 71 ejects ink toward the sheet S supported by the platen 74 while reciprocating in the left-right direction. The recording head 71 ejects ink toward the sheet S, thereby recording an image on the sheet S.

The second discharge path P23 is a path disposed between the second discharge roller pair 64 and the discharge tray 23. The sheet S that passed through the recording head 71 is conveyed along the second discharge path P23 by the second discharge roller pair 64, is further conveyed by the second reverse roller pair 65 disposed downstream of the second discharge roller pair 64 in the conveyance direction, and is discharged to the discharge tray 23. The sheet S that is conveyed along the second path P2 and on which an image is recorded by the recording unit 7 is intermittently conveyed along the second path P2 each time the recording head 71 moves in the left-right direction to record an image of one line on the sheet S.

The second discharge roller pair 64 and the second reverse roller pair 65 may be driven by a drive source (not shown) provided in the printer 1. The second discharge roller pair 64 may convey the sheet S to the downstream side in the conveyance direction along the second path P2, and the second reverse roller pair 65 may convey the sheet S to the downstream side in the conveyance direction along the second path P2 and may convey the sheet S to the upstream side in the conveyance direction along the second path P2.

The printer 1 includes a re-conveyance path P4 for guiding the sheet S conveyed along the second path P2 toward the second path P2 again. One end of the re-conveyance path P4 is connected to the second path P2 at a connection position C4 between the second discharge roller pair 64 and the second reverse roller pair 65 on the second discharge path P23. That is, the second path P2 is connected to the re-conveyance path P4 between the recording head 71 and the second reverse roller pair 65. The other end of the re-conveyance path P4 is connected to the second path P2 at a connection position C5 between the connection position C3 with the curved path P21 and the second conveyance roller pair 63.

The sheet S that passed through the first path P1 and was conveyed to the downstream side in the conveyance direction by the first reverse roller 62 is discharged to the discharge tray 23. The sheet S that passed through the second path P2 and was conveyed to the downstream side in the conveyance direction by the second reverse roller 65 is discharged to the discharge tray 23.

As described above, both of the sheet S that passed through the first path P1 but did not pass through the second path P2 and the sheet S that passed through the first path P1 and passed through the second path P2 are discharged to the discharge tray 23. As a result, the sheet S conveyed along the first path P1 and the sheet S conveyed along the second path P2 are discharged to a common discharge destination, and a discharge position of the sheet S discharged from the printer 1 may be easily grasped.

The recording head 71 of the recording unit 7 is disposed at an upstream side in a discharge direction of the sheet S discharged from the second path P2, that is, at a rear end portion of the housing 2, and the discharge tray 23 is disposed in front of the recording head 71, so that a protruding amount of the discharge tray 23 from the housing 2 in the front-rear direction may be reduced, and the size of the printer 1 in the horizontal direction may be reduced.

Further, since it is possible to discharge the sheet S that passed through the first path P1 but did not pass through the second path P2 to the discharge tray 23, when an image is formed on the sheet S by the image forming unit 5 only, the sheet S may be discharged to the discharge tray 23 without passing through the recording unit 7 after an image is formed by the image forming unit 5. In this manner, since it is not necessary to convey a sheet S that is required for the image formation by the image forming unit 5 only to the recording unit 7, throughput of the conveyance of the sheet S in the printer 1 is not reduced when an image is formed on the sheet S by the image forming unit 5 only. As a result, it is possible to reduce the influence on a first print out time that is a time from when the printer 1 is instructed to start image formation up to when a first sheet S on which an image is formed by the image forming unit 5 is discharged to the discharge tray 23.

The discharge tray 23 is formed on a surface that defines a lower side of the discharge space 2C, and the sheet S conveyed along the first path P1 and the sheet S conveyed along the second path P2 are discharged toward the first front opening 21*a* of the discharge space 2C. In this manner, since a lower surface that defines the discharge space 2C is used as the discharge tray 23, a protruding amount of the discharge tray 23 from the housing 2 may be reduced and the size of the printer 1 in the horizontal direction may be reduced.

The front face 21 of the housing 2 has a first face 21A in which the first front opening 21*a* of the discharge space 2C is formed, and a second face 21B located below the first face 21A. In the discharge direction of the sheet S, the first face 21A is located upstream of the second face 21B in the discharge direction, that is, rearward of the second face 21B. A user of the printer 1 often views the sheet S discharged to the discharge tray 23 from a front upper side of the printer 1, and the user may easily view the sheet S discharged to the discharge tray 23 since the first face 21A located above the second face 21B is located rearward of the second face 21B.

The housing 2 has side walls 24 at both side ends in the left-right direction that is a width direction orthogonal to the discharge direction of the sheet S to the discharge tray 23. The left and right side walls 24 are respectively disposed at positions adjacent to the discharge space 2C in the left-right direction. The left side wall 24 has a cut-out portion 24*a* at a front end of the housing 2 that is a downstream end in the discharge direction of the sheet S. The cut-out portion 24*a* is recessed toward the upstream side in the discharge direction. That is, the left side wall 24 is formed into a shape recessed rearward at a position where the discharge space 2C is formed.

This makes it easy to visually view the sheet S discharged to the discharge tray 23 through the cut-out portion 24*a*. In particular, when the user views the discharge tray 23 from the left and views the discharge tray 23 in front of and above the printer 1, the user may easily view the discharged sheet S. Although the cut-out portion 24*a* is formed in the left side wall 24 in the present embodiment, the cut-out portion 24*a* may be formed in the right side wall 24. Further, the cut-out portion 24*a* may be formed in both the left side wall 24 and the right side wall 24.

In the printer 1, the discharge tray 23 may be colored with a color different from a color of an outer face of the housing 2. That is, the discharge tray 23 and outer faces of the front face 21, the side walls 24, a rear face 25, and the like of the housing 2 may be colored with different colors. This makes it easy to recognize an arrangement position of the discharge tray 23 in the printer 1, and makes it easy to grasp a discharge position of the sheet S.

In particular, the position of the discharge tray 23 may be emphasized by coloring the discharge tray 23 and the outer face of the housing 2 with different colors having a large contrast. For example, the outer face of the housing 2 may be colored in white, and the discharge tray 23 may be colored in orange.

In the printer 1, a sheet S contained in the sheet cassette 10 is conveyed along the first path P1, passes through the image forming position G1 of the image forming unit 5, thereafter, the sheet S is guided along the second path P2, and passes through the image recording position G2 of the recording unit 7. The image recording position G2 of the recording unit 7 is located above the image forming position G1 of the image forming unit 5. Specifically, the recording head 71 of the recording unit 7 is located above the photosensitive drum 54 of the image forming unit 5. In this manner, since the recording head 71 is located above the photosensitive drum 54, the size of the printer 1 in the horizontal direction may be reduced.

The rear face 25 of the housing 2 is formed with a rear face opening 25*a*, and is provided with a second sheet tray 26 that may support the sheet S supplied to the image recording position G2 of the recording unit 7 through the rear face opening 25*a*. The second sheet tray 26 is disposed at a rear side portion that is the other side portion opposite to the one side portion of the housing 2 in the front-rear direction. The sheet S supported by the second sheet tray 26 is conveyed to the second conveyance path P22 by the second conveyance roller pair 63, and an image is recorded by the recording head 71. Thereafter, the sheet S is conveyed along the second discharge path P23 by the second discharge roller pair 64 and the second reverse roller pair 65, and is discharged to the discharge tray 23.

The printer 1 includes the first sheet tray 22 that supports a sheet S to be supplied to the image forming position G1 of the image forming unit 5, and the second sheet tray 26 that supports a sheet S to be supplied to the image recording position G2 of the recording unit 7. The first sheet tray 22 is disposed at a front side portion that is the one side portion of the housing 2, and the second sheet tray 26 is disposed at a rear side portion that is the other side portion of the housing 2.

Accordingly, the sheet S supported by the first sheet tray 22 and the sheet S supported by the second sheet tray 26 may be respectively supplied to the image forming unit 5 and the recording unit 7. In this case, since the first sheet tray 22 and the second sheet tray 26 are disposed at opposite sides of the housing 2 in the front-rear direction which is the discharge direction of the sheet S, it is easy to grasp whether the sheets S disposed on the first sheet tray 22 and the second sheet tray 26 are to be supplied to the image forming unit 5 or the recording unit 7.

The housing 2 includes an upper face cover 29*b* that constitutes a portion of an upper face 29 of the housing 2 and opens and closes an upper face opening 29*a* formed in the housing 2. The upper face cover 29*b* may be rotated about a rotation shaft 291 that is disposed at a rear end of the housing 2 and extends in the left-right direction. The upper face cover 29*b* may be moved between a first position (a position indicated by a two-dot chain line in FIGS. 1 and 2) where the upper face opening 29*a* is opened and a second position (a position indicated by a solid line in FIGS. 1 and 2) where the upper face opening 29*a* is closed, when the upper face cover 29*b* is rotated about the rotation shaft 291.

When the upper face cover 29*b* is moved to the first position and the upper face opening 29*a* is opened, the second path P2 along which the sheet S on which an image is recorded by the recording head 71 of the recording unit 7 is conveyed is exposed through the upper face opening 29*a*. When the upper face cover 29*b* is moved to the second position and the upper face opening 29*a* is closed, the second path P2 is covered by the upper face cover 29*b*.

As a result, the second path P2 may be exposed to the outside by moving the upper face cover 29*b* to the first position, and when a jam occurs for a sheet S conveyed along the second path P2, the jam may be easily settled.

The housing 2 includes a first cover 27 that opens and closes a first opening 2*a* formed in a front portion of the housing 2, a first operation portion 27*a* for performing an opening and closing operation on the first cover 27, a second cover 28 that opens and closes a second opening 2*b* formed in a front portion of the housing 2, and a second operation portion 28*a* for performing an opening and closing operation on the second cover 28.

The first cover 27 is provided over substantially the entire left and right regions of a front portion of the second housing 2B. The first operation portion 27*a* is disposed at a right end portion of an upper face of the first cover 27. The first cover 27 may be rotated forward and backward about a lower end portion, and may be moved between a close position (a position indicated by a solid line in FIGS. 3 and 4) where the first opening 2*a* is closed and an open position (a position indicated by a two-dot chain line in FIGS. 3 and 4) where the first opening 2*a* is opened, by operating the first operation portion 27*a*.

In an open state in which the first cover 27 is in the open position, it is possible to replenish the toner containing chamber 51 with toner through the first opening 2*a*. In the present embodiment, the toner containing chamber 51 is provided in the process cartridge 50 that may be attached to and detached from the housing 2 through the first opening 2*a*, and the toner containing chamber 51 may be replenished with toner by replacing the used process cartridge 50 with a new process cartridge 50. That is, the toner containing chamber 51 is configured as a toner cartridge that may be attached to and detached from the housing 2 through the first opening 2*a*. In this manner, since the toner containing chamber 51 may be attached to and detached from the housing 2, it is easy to replenish the toner containing chamber 51 with toner.

The toner containing chamber 51 may be configured as a toner containing portion built in the housing 2 in the printer 1, and the toner containing portion may be replenished with toner by connecting a toner replenishing container filled with toner to the toner containing portion and injecting the toner in the toner replenishing container into the toner containing portion. In this case, the housing 2 may be provided with an opening that exposes a connection portion of the toner containing portion with the toner replenishing container and a cover that covers the opening, and the cover is opened to expose the connection portion from the opening, so that the toner containing portion may be replenished with toner.

The second cover 28 is disposed above the first cover 27, and is provided at a right end portion of a front portion of the first housing 2A. The second operation portion 28*a* is disposed at a right side portion of an upper end portion of the second cover 28. The second cover 28 is may be rotated forward and backward about a lower end portion, and may be moved between a close position (a position indicated by a solid line in FIGS. 3 and 4) where the second opening 2*b* is closed and an open position (a position indicated by a two-dot chain line in FIGS. 3 and 4) where the second opening 2*b* is opened, by operating the second operation portion 28*a*.

In an open state in which the second cover 28 is in the open position, the ink containing chamber 72 may be replenished with ink through the second opening 2*b*. In the present embodiment, the ink containing chamber 72 includes an ink cartridge 72*a* that may be attached and detached through the second opening 2*b*, and the ink containing chamber 72 may be replenished with ink by replacing the used ink cartridge 72*a* with a new ink cartridge 72*a*. In this manner, since the ink containing chamber 72 includes the ink cartridge 72*a* that may be attached and detached, it is easy to replenish the ink containing chamber 72 with ink.

The ink containing chamber 72 may be configured as an ink tank that may store ink in the printer 1, and the ink containing chamber 72 may be replenished with ink by connecting an ink replenishing container filled with ink to the ink tank built in the housing 2 and injecting the ink in the ink replenishing container into the ink containing chamber 72. In this case, the housing 2 may be provided with an opening that exposes a connection portion of the ink tank with the ink replenishing container and a cover that covers the opening, and the cover is opened to expose the connection portion from the opening, so that the ink tank may be replenished with ink.

As described above, the printer 1 may be configured such that the first operation portion 27*a* is operated to open the first opening 2*a* when replenishing the toner containing chamber 51 with toner, and the second operation portion 28*a* is operated to open the second opening 2*b* when replenishing the ink containing chamber 72 with ink. In this case, since the first operation portion 27*a* and the second operation portion 28*a* are collectively disposed at a right end portion in the left-right direction of the front portion of the housing 2 that is one side of the housing 2 in the horizontal direction, it is easy to grasp the positions of the first operation portion 27*a* and the second operation portion 28*a* that are operated when replenishing a consumable such as toner and ink.

The first operation portion 27*a* and the second operation portion 28*a* are disposed at positions different from the discharge tray 23 in the left-right direction that is a direction orthogonal to the discharge direction of the sheet S in the horizontal direction. In the present embodiment, the first operation portion 27*a* and the second operation portion 28*a* are located at a right side of the discharge tray 23 in the left-right direction. As a result, the first operation portion 27*a* and the second operation portion 28*a* may be operated without being obstructed by the sheet S discharged to the discharge tray 23.

Figure 5:
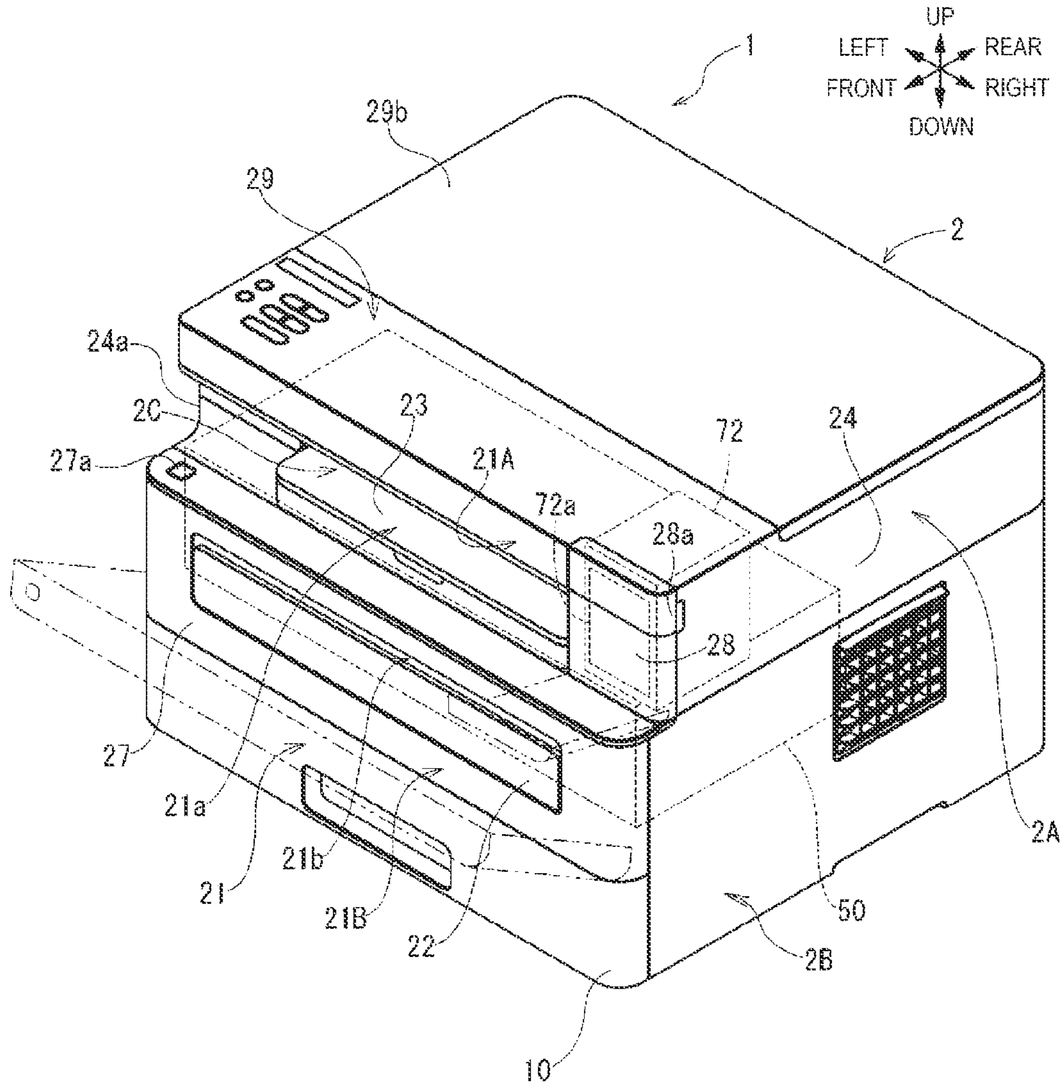
FIG. 5 is a perspective view showing the printer in which a first operation portion of a first cover and a second operation portion of a second cover are disposed at different sides in a horizontal direction in a housing.

As shown in FIG. 5, the first operation portion 27*a* and the second operation portion 28*a* may be disposed at different sides of the housing 2 in the horizontal direction. For example, the first operation portion 27*a* may be disposed at one side in the left-right direction that is one side of the housing 2 in the horizontal direction, and the second operation portion 28*a* may be disposed at the other side in the left-right direction that is the other side of the housing 2 in the horizontal direction. In this manner, since the first operation portion 27*a* and the second operation portion 28*a* are disposed at different sides of the housing 2 in the horizontal direction, it is easy to simultaneously operate the first operation portion 27*a* and the second operation portion 28*a*, and it is possible to efficiently replace a consumable such as toner and ink.

Figure 6:
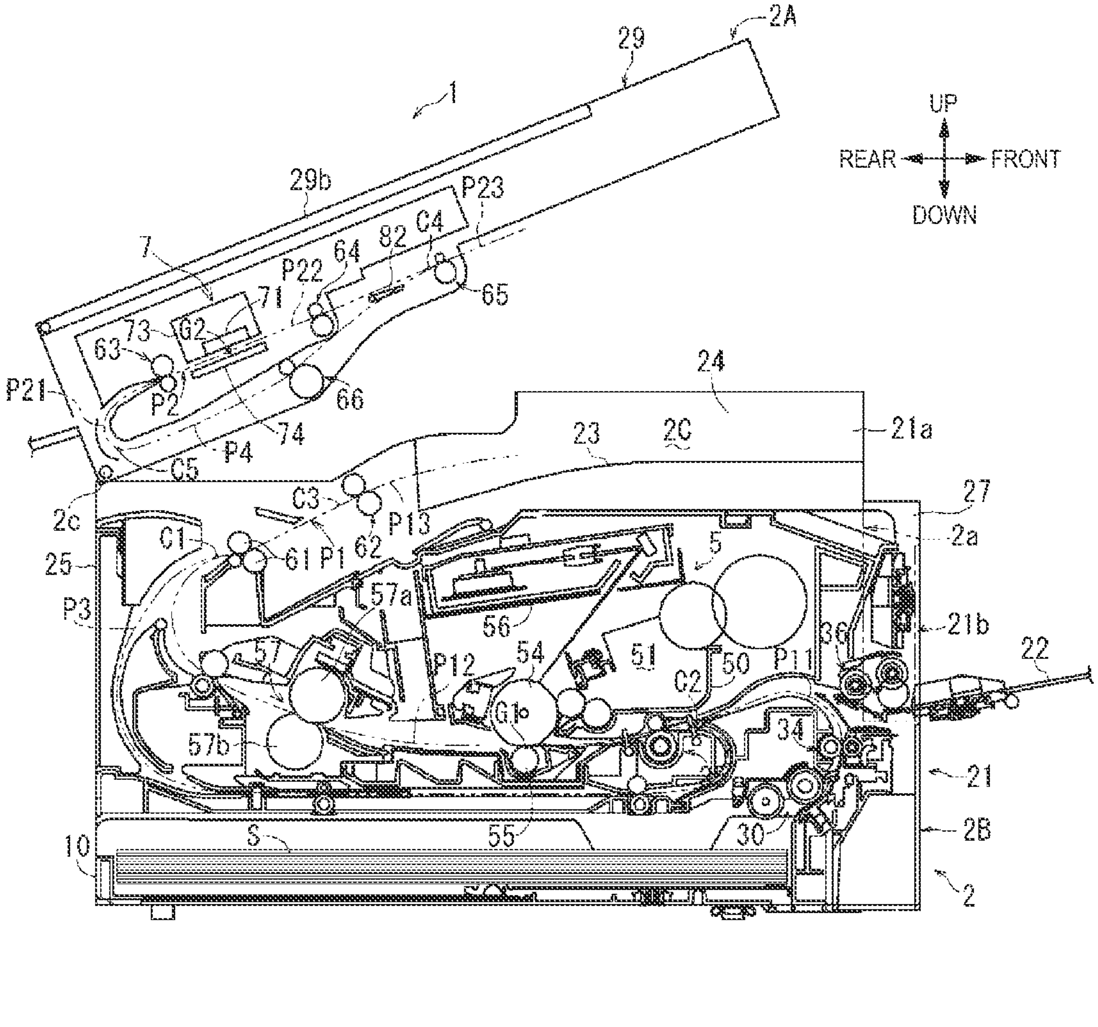
FIG. 6 is a side cross-sectional view showing the printer in a state in which a first housing is moved, relative to a second housing, to a second position where a distance between the first housing and a discharge tray is larger than a distance between the first housing and the discharge tray at a first position.

As shown in FIG. 6, the first housing 2A may be rotated about a rotation shaft 2*c* that is disposed at a rear end of the housing 2 and extends in the left-right direction. The first housing 2A defines at least an upper side of the discharge space 2Mayd may be moved between a first position (the position shown in FIG. 1) where a distance between the first housing 2A and the discharge tray 23 is small and a second position (a position shown in FIG. 6) where a distance between the first housing 2A and the discharge tray 23 is larger than that at the first position, when the first housing 2A is rotated about the rotation shaft 2*c*.

As a result, when the first housing 2A that defines the upper side of the discharge space 2C is moved from the first position to the second position, the discharge space 2C above the discharge tray 23 may be widely opened.

Therefore, it is possible to easily settle a jam that occurred when a sheet S is jammed in the first discharge roller pair 61 and the first reverse roller pair 62 for discharging a sheet S to the discharge tray 23. Further, when an image is formed on the sheet S by the image forming unit 5 only, a large volume amount of sheets S on the discharge tray 23 may be ensured. Although the first housing 2A may be rotated about the rotation shaft 2*c* in the present embodiment, the housing 2 may be configured such that the first housing 2A is fixed and may not be rotated.

Sheet Conveying Operation

Next, a conveying operation of a sheet S in the printer 1 will be described.

Single-side Image Formation by Image Forming Unit

During single-side image formation in which an image is formed on one side of a sheet S by the image forming unit 5, the sheet S is conveyed as follows. During the single-side image formation by the image forming unit 5, first, a sheet S contained in the sheet cassette 10 is conveyed along the first sheet feeding path P11 by the first sheet feeding unit 30 and is fed to the image forming unit 5.

Figure 7:
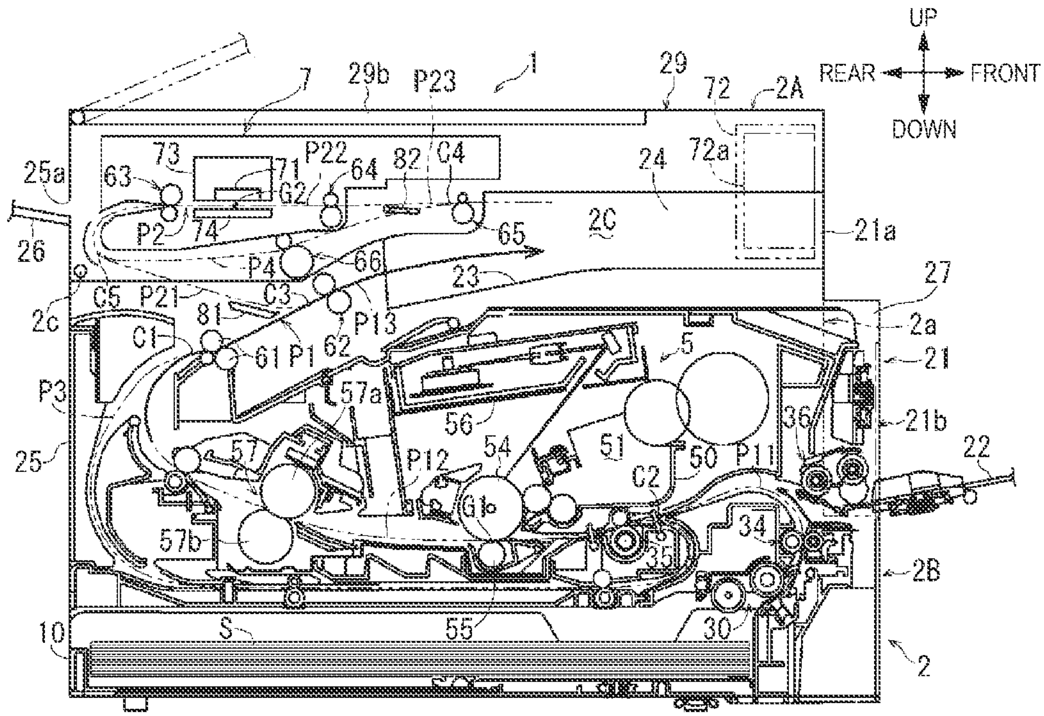
FIG. 7 is a side cross-sectional view showing a state in which a sheet conveyed to a downstream side in a conveyance direction of an image forming unit is discharged to the discharge tray along a first discharge path.

The sheet S fed to the image forming unit 5 is conveyed from the image forming unit 5 to the downstream side in the conveyance direction after an image is formed on one side of the sheet S at the image forming position G1 of the image forming unit 5. As shown in FIG. 7, the sheet S conveyed to the downstream side in the conveyance direction of the image forming unit 5 is conveyed to the downstream side in the conveyance direction along the first discharge path P13 by the first discharge roller pair 61 and the first reverse roller pair 62, and is discharged to the discharge tray 23.

Double-side Image Formation by Image Forming Unit

During double-side image formation in which images are formed on both sides of a sheet S by the image forming unit 5, the sheet S is conveyed by a conveying operation similar to that during the single-side image formation up to when the sheet S on which an image formed on one side by the image forming unit 5 is conveyed to the downstream side in the conveyance direction of the image forming unit 5. The sheet S conveyed to the downstream side in the conveyance direction of the image forming unit 5 is conveyed to the downstream side in the conveyance direction along the first discharge path P13 by the first discharge roller pair 61 and the first reverse roller pair 62.

Figure 8A:
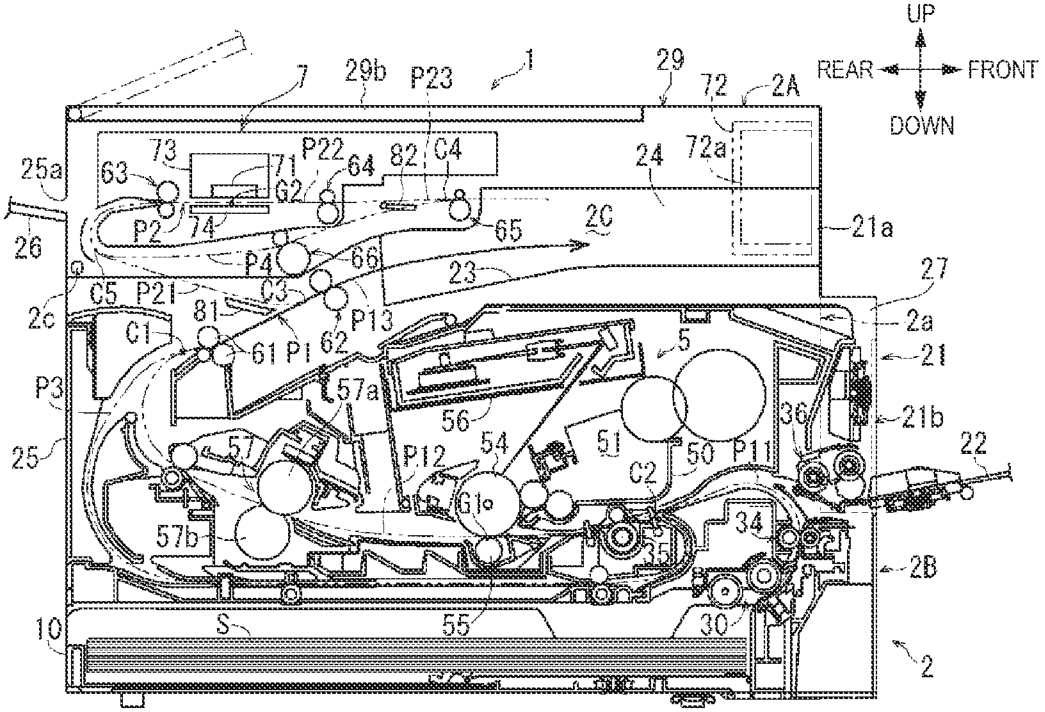
FIG. 8A is a side cross-sectional view showing a state in which a trailing end of a sheet conveyed to the downstream side in the conveyance direction along the first discharge path arrives at a first position between a first discharge roller pair and a connection position C1 on the first discharge path.

Thereafter, as shown in FIG. 8A, when a trailing end of the sheet S conveyed to the downstream side in the conveyance direction along the first discharge path P13 arrives at a first position between the first discharge roller pair 61 and the image forming unit 5 on the first discharge path P13, specifically, between the first discharge roller pair 61 and the connection position C1 in the first discharge path P13, a rotation direction of the first reverse roller pair 62 is reversed and the sheet S is conveyed to the upstream side in the conveyance direction.

Figure 8B:
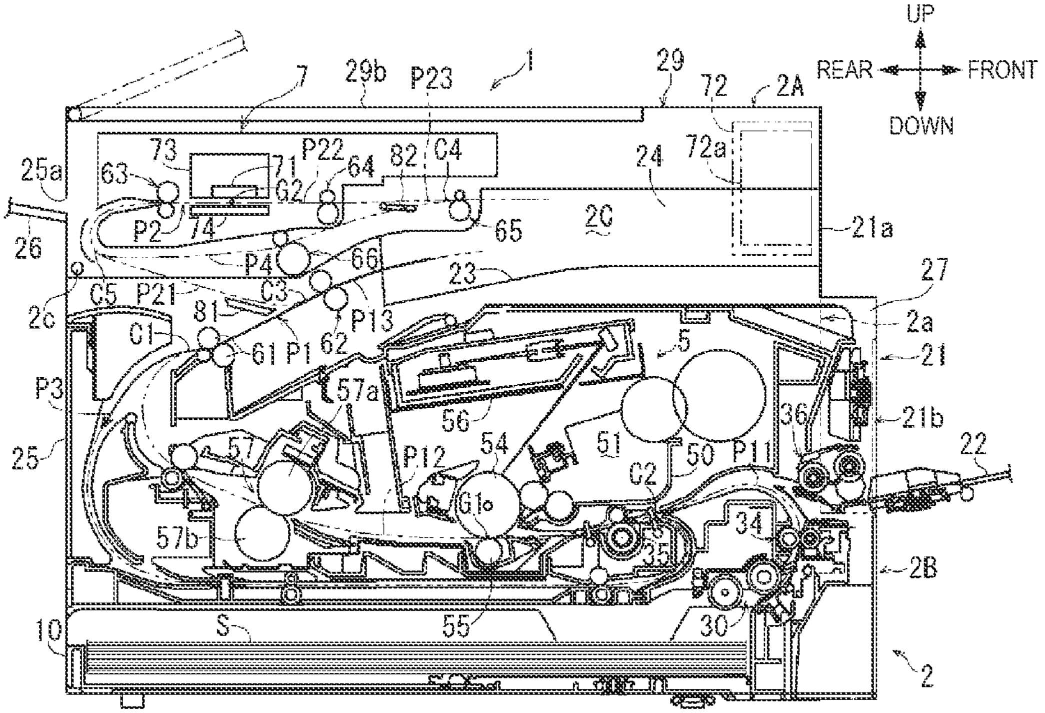
FIG. 8B is a side cross-sectional view showing a state in which the sheet whose trailing end is located at the first position is conveyed to an upstream side in the conveyance direction by a first reverse roller pair and is guided to a return path.

As shown in FIG. 8B, when the sheet S whose trailing end is positioned at the first position is conveyed to the upstream side in the conveyance direction by the first reverse roller pair 62, the sheet S is guided to the return path P3. The sheet S guided to the return path P3 is conveyed along the return path P3 and arrives at the connection position C2 of the first path P1. The sheet S that arrived at the connection position C2 is conveyed to the image forming unit 5, and the sheet S is conveyed to the first discharge path P13 of the first path P1 after an image is formed on the other side of the sheet S at the image forming position G1 of the image forming unit 5. The sheet S conveyed to the first discharge path P13 is discharged to the discharge tray 23 by the first discharge roller pair 61 and the first reverse roller pair 62.

As described above, when the image forming unit 5 forms images on both sides of a sheet S, the first reverse roller pair 62 conveys the sheet S to the return path P3 based on the fact that the trailing end of the sheet S conveyed to the downstream side in the conveyance direction is positioned at the first position between the first discharge roller pair 61 and the connection position C1 on the first discharge path P13.

Single-side Recording by Recording Unit

During single-side recording in which an image is recorded on one side of a sheet S by the recording unit 7, the sheet S is conveyed by a conveying operation similar to that during the single-side image formation or during the double-side image formation up to when the sheet S that passed through the image forming unit 5 is conveyed to the downstream side in the conveyance direction of the image forming unit 5.

Figure 9A:
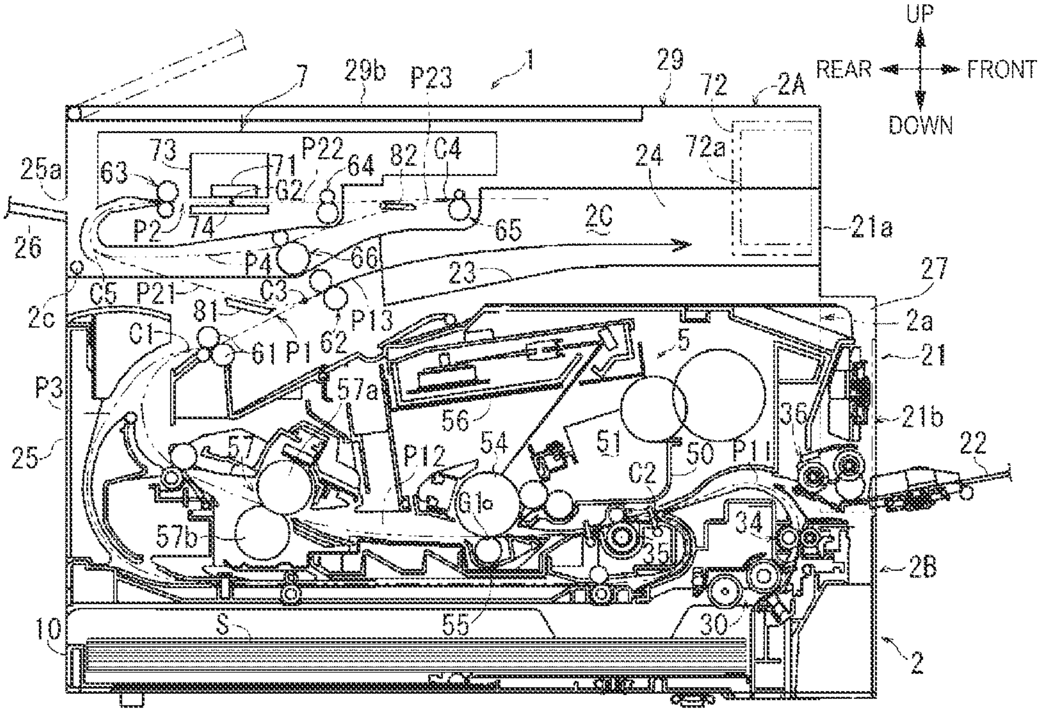
FIG. 9A is a side cross-sectional view showing a state in which a trailing end of a sheet conveyed to the downstream side in the conveyance direction arrives at a second position between a connection position C3 and the first reverse roller pair on the first discharge path.

The sheet S conveyed to the downstream side in the conveyance direction of the image forming unit 5 is conveyed to the downstream side in the conveyance direction along the first discharge path P13 by the first discharge roller pair 61 and the first reverse roller pair 62, and then is conveyed to the upstream side in the conveyance direction by the first reverse roller pair 62. In this case, as shown in FIG. 9A, when a trailing end of the sheet S conveyed to the downstream side in the conveyance direction arrives at a second position between the first discharge roller pair 61 and the first reverse roller pair 62 on the first discharge path P13, specifically, between the connection position C3 and the first reverse roller pair 62, a rotation direction of the first reverse roller pair 62 is reversed, and the sheet S is conveyed to the upstream side in the conveyance direction.

Figure 9B:
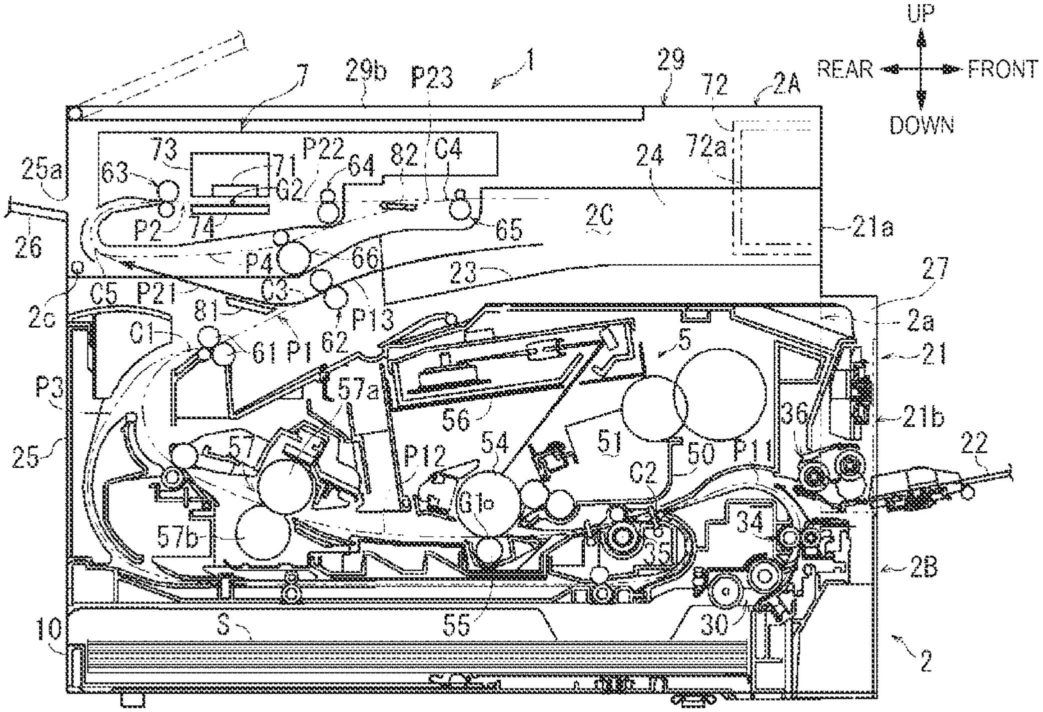
FIG. 9B is a side cross-sectional view showing a state in which the sheet whose trailing end is located at the second position is conveyed to an upstream side in the conveyance direction by the first reverse roller pair and is guided to a second path.

As shown in FIG. 9B, when the sheet S whose trailing end is positioned at the second position is conveyed to the upstream side in the conveyance direction by the first reverse roller pair 62, the sheet S is guided from the connection position C3 to the second path P2. In this case, the first reverse roller pair 62, the connection position C3 on the first path P1, and the second path P2 are positioned above the first discharge roller pair 61, and the sheet S whose trailing end is positioned at the second position is easily guided to the second path P2. Since the housing 2 is provided with a guide rib 81 for guiding a sheet S conveyed to the upstream side in the conveyance direction toward the second path P2, the sheet S may be guided to the second path P2 more easily.

The sheet S guided to the second path P2 is conveyed along the curved path P21 of the second path P2.

Figure 10:
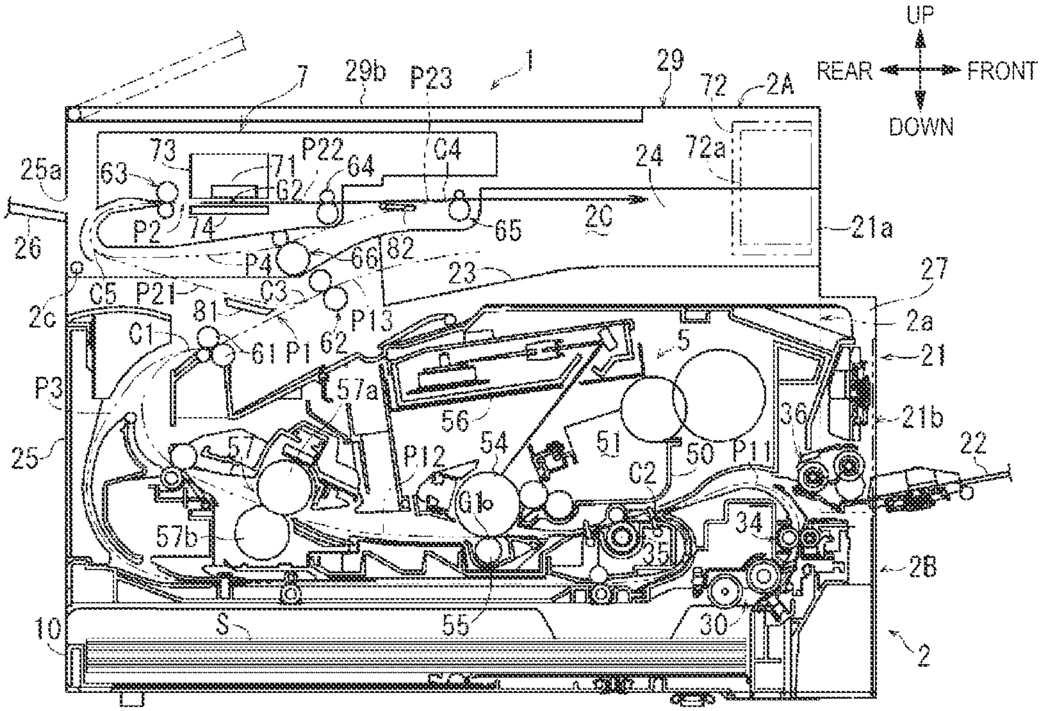
FIG. 10 is a side cross-sectional view showing a state in which a sheet on which an image is recorded by a recording head is conveyed to the downstream side in the conveyance direction and is discharged to the discharge tray.

The sheet S conveyed along the curved path P21 is conveyed along the second conveyance path P22 by the second conveyance roller pair 63, and an image is recorded on one side of the sheet S by the recording head 71. As shown in FIG. 10, the sheet S on which an image is recorded by the recording head 71 is conveyed to the second discharge path P23 by the second discharge roller pair 64, then is conveyed to the downstream side in the conveyance direction by the second reverse roller pair 65, and is discharged to the discharge tray 23.

In this manner, after the sheet S is conveyed to the downstream side in the conveyance direction along the first discharge path P13 of the first path P1, the first reverse roller 62 is configured to convey the sheet S to the upstream side in the conveyance direction so as to convey the sheet S toward the second path P2. As a result, it is possible to ensure a length of a path between the image forming unit 5 and the recording unit 7 from when a sheet S passes through the image forming unit 5 up to when the sheet S arrives at the recording unit 7. Therefore, the image forming unit 5 and the recording unit 7 may be disposed in a manner of being close to each other in the upper-lower direction, and the size of the printer 1 in the upper-lower direction may be reduced.

In this case, the first reverse roller 62 conveys a sheet S toward the second path P2 based on the fact that the trailing end of the sheet S is positioned at the second position between the connection position C3 and the first reverse roller pair 62 on the first path P1. The first reverse roller 62 conveys the sheet S to the return path P3 based on the fact that the trailing end of the sheet S is positioned at the first position between the first discharge roller pair 61 and the connection position C1 on the first path P1.

In this manner, a conveyance destination of the sheet S is switched between the return path P3 and the second path P2 based on the position of the trailing end of the sheet S on the first path P1 when the sheet S is conveyed to the upstream side in the conveyance direction by the first reverse roller 62. Therefore, the conveyance destination of the sheet S may be easily switched.

When the sheet S is conveyed to the upstream side in the conveyance direction by the first reverse roller 62 and the sheet S is conveyed to the second path P2, the sheet S on which an image is formed on one side of the sheet S by the image forming unit 5 and the sheet S on which images are formed on both sides of the sheet S by the image forming unit 5 may be conveyed to the second path P2. It is also possible to convey the sheet S that simply passes through the image forming unit 5 and on which an image is not formed by the image forming unit 5 to the second path P2.

In the printer 1, when an image is formed by the image forming unit 5 on a sheet S conveyed along the first path P1 and then an image is recorded by the recording unit 7 on the sheet S conveyed along the second path P2, the image forming unit 5 may form an image on one side of the sheet S and the recording unit 7 may record an image on one side of the sheet S on which an image is formed by the image forming unit 5.

Double-side Recording by Recording Unit

During double-side recording in which images are recorded on both sides of a sheet S by the recording unit 7, the sheet S is conveyed by a conveying operation similar to that during a single-side image recording up to when the sheet S on which an image is recorded on one side by the recording unit 7 is conveyed to the downstream side in the conveyance direction of the recording unit 7. The sheet S conveyed to the downstream side in the conveyance direction of the recording unit 7 is conveyed to the downstream side in the conveyance direction along the second discharge path P23 by the second discharge roller pair 64 and the second reverse roller pair 65.

Figure 11:
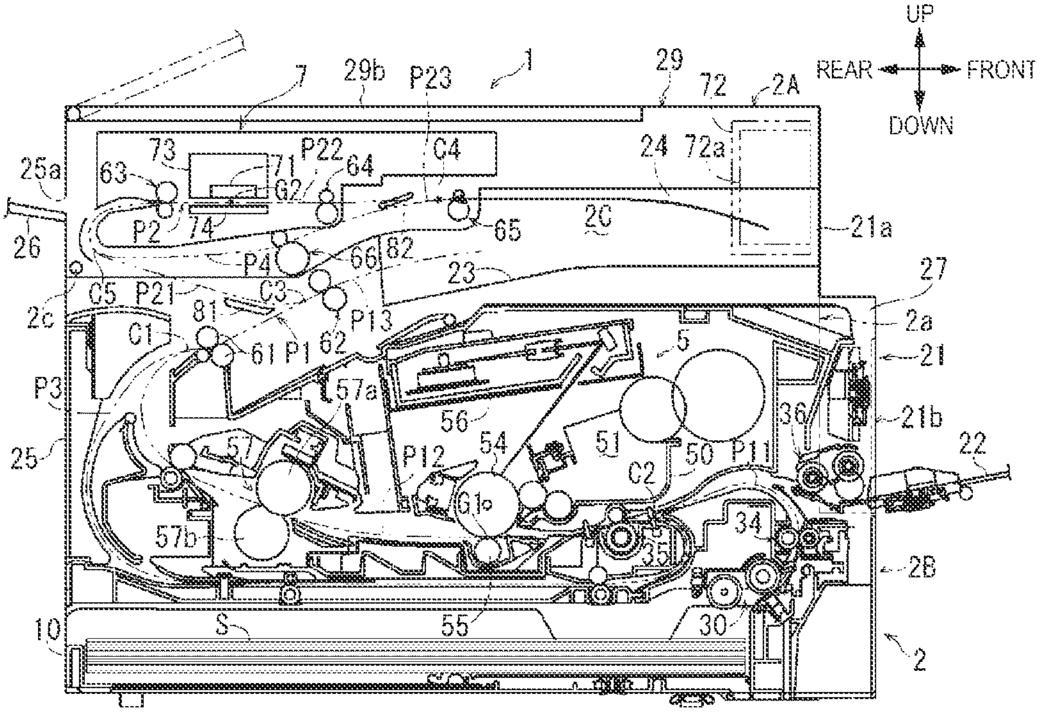
FIG. 11 is a side cross-sectional view showing a state in which a sheet whose trailing end arrives at a position between a connection position C4 and a second reverse roller pair on the second path is conveyed to the upstream side in the conveyance direction by the second reverse roller pair.

As shown in FIG. 11, the printer 1 includes a flapper 82. The flapper 82 is disposed between the second discharge roller pair 64 and the second reverse roller pair 65 on the second path P2.

The flapper 82 may be moved between a first position (a position shown in FIG. 11) where the flapper 82 closes the second path P2 and guides a sheet S conveyed to the upstream side in the conveyance direction by the second reverse roller pair 65 to the re-conveyance path P4 and a second position (a position shown in FIG. 10) where the flapper 82 opens the second path P2 and a sheet S is conveyable along the second path P2. The flapper 82 may be switched between the first position and the second position by a drive unit (not shown).

As shown in FIG. 10, when a sheet S is conveyed from the recording unit 7 to the downstream side in the conveyance direction, the flapper 82 is switched to the second position, and the sheet S is conveyed to the downstream side in the conveyance direction along the second discharge path P23 of the second path P2. As shown in FIG. 11, when a trailing end of the sheet S arrives at a position between the connection position C4 and the second reverse roller pair 65 on the second path P2, a rotation direction of the second reverse roller pair 65 that conveys the sheet S to the downstream side in the conveyance direction is reversed, and the sheet S is conveyed to the upstream side in the conveyance direction.

When the conveyance direction of a sheet S conveyed by the second reverse roller pair 65 is reversed from the upstream side in the conveyance direction to the downstream side in the conveyance direction, the flapper 82 is moved from the second position to the first position and guides the sheet S conveyed to the upstream side in the conveyance direction to the re-conveyance path P4. The printer 1 includes a re-conveyance roller pair 66 that is disposed on the re-conveyance path P4 and conveys the sheet S toward the second path P2. The re-conveyance roller pair 66 is an example of a re-conveyance roller.

The sheet S guided to the re-conveyance path P4 is conveyed along the re-conveyance path P4 by the re-conveyance roller pair 66 and arrives at the connection position C5 on the second path P2. The sheet S that arrived at the connection position C5 is conveyed to the recording unit 7, and after an image is recorded on the other side of the sheet S at the image recording position G2 of the recording unit 7, the sheet S is conveyed to the second discharge path P23 of the second path P2. The sheet S conveyed to the second discharge path P23 is discharged to the discharge tray 23 by the second discharge roller pair 64 and the second reverse roller pair 65.

Figure 12:
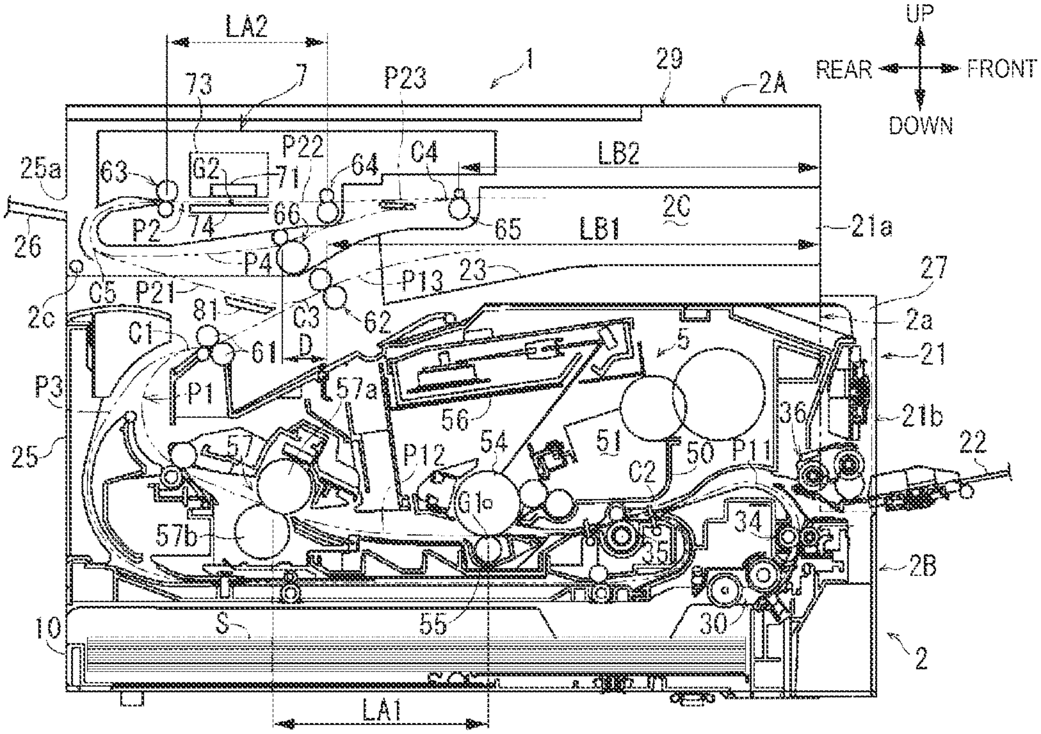
FIG. 12 is a side cross-sectional view showing a distance between sheet conveyance rollers on the first path and the second path.

As shown in FIG. 12, a plurality of rollers are disposed on the first path P1 as rollers for conveying a sheet S, such as the first conveyance roller pair 34, the registration roller pair 35, the photosensitive drum 54, the transfer roller 55, the heating roller 57*a*, the pressurizing roller 57*b*, the first discharge roller pair 61, and the first reverse roller pair 62. Among these rollers, a distance between the photosensitive drum 54, the transfer roller 55 and the heating roller 57*a*, the pressurizing roller 57*b* is the largest distance between adjacent rollers. The distance between the photosensitive drum 54, the transfer roller 55 and the heating roller 57*a*, the pressurizing roller 57*b* is defined as LA1. Therefore, a minimum length in the conveyance direction of the sheet S that may be conveyed along the first path P1 is a length corresponding to the distance LA1.

A plurality of rollers are disposed on the second path P2 as rollers for conveying a sheet S, such as the second conveyance roller pair 63, the second discharge roller pair 64, the second reverse roller pair 65, and the re-conveyance roller pair 66. Among these rollers, a distance between the second conveyance roller pair 63 and the second discharge roller pair 64 is the largest distance between adjacent rollers. The distance between the second conveyance roller pair 63 and the second discharge roller pair 64 is defined as LA2. Therefore, a minimum length in the conveyance direction of the sheet S that may be conveyed along the second path P2 is a length corresponding to the distance LA2.

In the printer 1, the distance LA2 on the second path P2 is set to be smaller than the distance LA1 on the first path P1. Therefore, the minimum length in the conveyance direction of a sheet S that may be conveyed along the second path P2 is smaller than the minimum length in the conveyance direction of the sheet S that may be conveyed along the first path P1. As a result, for example, when an image is recorded on the sheet S supported by the second sheet tray 26, the recording unit 7 may record an image on a sheet S the sheet S having a smaller size than the sheet S having a minimum size at which the image forming unit 5 may form an image.

Among the plurality of rollers that convey a sheet S and are disposed on the first path P1, the most downstream roller located at the most downstream side in the conveyance direction of the sheet S is the first reverse roller pair 62. The first reverse roller pair 62 is a roller that discharges the sheet S to the discharge tray 23, and is an example of a first most downstream roller. A distance between the first reverse roller pair 62 and a downstream end in the conveyance direction of the discharge tray 23 is defined as LB1.

Among the plurality of rollers that convey a sheet S and are disposed on the second path P2, the most downstream roller located at the most downstream side in the conveyance direction of the sheet S is the second reverse roller pair 65. The second reverse roller pair 65 is a roller that discharges the sheet S to the discharge tray 23, and is an example of a second most downstream roller. A distance between the second reverse roller pair 65 and a downstream end in the conveyance direction of the discharge tray 23 is defined as LB2.

In the printer 1, the distance LB2 between the second reverse roller pair 65 and the downstream end in the conveyance direction of the discharge tray 23 is set to be shorter than the distance LB1 between the first reverse roller pair 62 and the downstream end in the conveyance direction of the discharge tray 23.

As a result, in the conveyance direction of a sheet S, the sheet S on which an image is recorded by the recording unit 7 is discharged to a side downstream of the sheet S on which an image is formed by the image forming unit 5. Therefore, particularly when an image is recorded on the sheet S having a small size, the sheet S discharged to the discharge tray 23 may be easily taken out.

In the printer 1, the first reverse roller pair 62 that is the most downstream roller on the first path P1 and the re-conveyance roller pair 66 disposed on the second path P2 are disposed at different positions in the conveyance direction of a sheet S conveyed by the first reverse roller pair 62. Specifically, the first reverse roller pair 62 is disposed in front of the re-conveyance roller pair 66 that a side downstream of the re-conveyance roller pair 66 by a distance D in the conveyance direction. As a result, the first reverse roller pair 62 and the re-conveyance roller pair 66 may be disposed at positions overlapping with each other in the upper-lower direction, and thus the size of the printer 1 in the upper-lower direction may be reduced.

First Modification

In the embodiment described above, the conveyance destination of a sheet S is switched between the return path P3 and the second path P2 based on a position of the trailing end of the sheet S on the first path P1. When the sheet S is conveyed to the downstream side in the conveyance direction by the first reverse roller pair 62 and then is conveyed to the upstream side in the conveyance direction, the conveyance destination of the sheet S may be switched between the return path P3 and the second path P2 as follows.

Figure 13A:
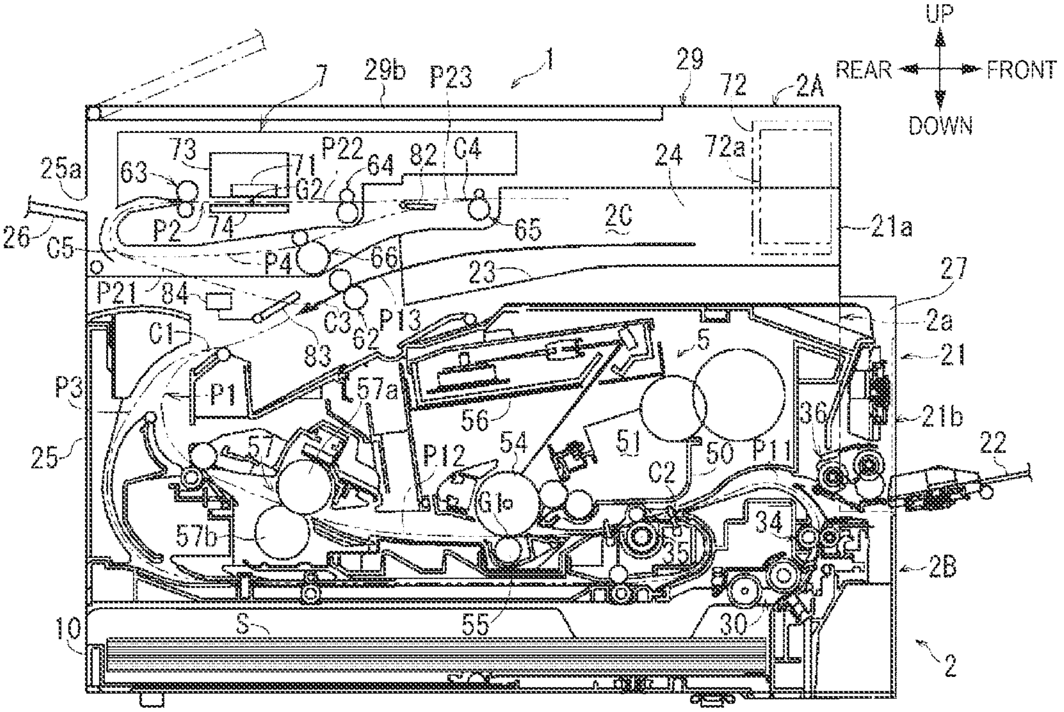
FIG. 13A is a side cross-sectional view showing a state in which a flapper driven by a drive unit is moved to a first position.
Figure 13B:
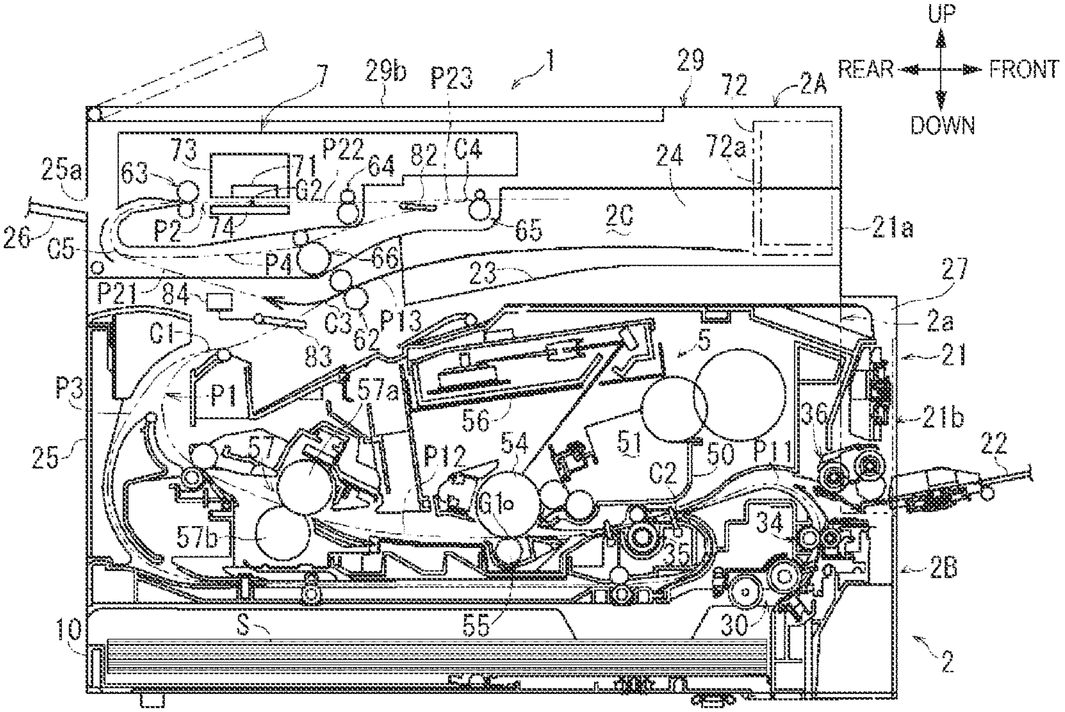
FIG. 13B is a side cross-sectional view showing a state in which the flapper driven by the drive unit is moved to a second position.

The printer 1 shown in FIGS. 13A and 13B includes a flapper 83 and a drive unit 84 that drives the flapper 83. The flapper 83 is provided between the fixing unit 57 and the first reverse roller pair 62 on the first discharge path P13 of the first path P1, more specifically, between the connection position C1 and the connection position C3.

The flapper 83 may be moved between a first position (a position shown in FIG. 13A) where the first discharge path P13 is opened and the sheet S conveyed to the upstream side in the conveyance direction by the first reverse roller pair 62 is guided to the return path P3 and a second position (a position shown in FIG. 13B) where the first discharge path P13 is closed and the sheet S conveyed to the upstream side in the conveyance direction by the first reverse roller pair 62 is guided to the second path P2. The drive unit 84 is an actuator connected to the flapper 83, and may switch a position of the flapper 83 between the first position and the second position.

In the printer 1 according to the present embodiment, when the sheet S conveyed to the upstream side in the conveyance direction by the first reverse roller pair 62 is guided to the return path P3, first, the flapper 83 is moved to the first position by the drive unit 84 to open the first discharge path P13, and the sheet S conveyed from the image forming unit 5 to the first discharge path P13 is conveyed to the downstream side in the conveyance direction by the first discharge roller pair 61 and the first reverse roller pair 62.

Thereafter, as shown in FIG. 13A, the flapper 83 is maintained at the first position, and when the trailing end of the sheet S conveyed to the downstream side in the conveyance direction is positioned between the first discharge roller pair 61 and the first reverse roller pair 62, a rotation direction of the first reverse roller pair is reversed to convey the sheet S to the upstream side in the conveyance direction. As a result, the flapper 83 at the first position may guide the sheet S to the return path P3.

When the sheet S conveyed to the upstream side in the conveyance direction by the first reverse roller pair 62 is guided to the second path P2, first, the flapper 83 is moved to the first position by the drive unit 84 to open the first discharge path P13, and the sheet S conveyed from the image forming unit 5 to the first discharge path P13 is conveyed to the downstream side in the conveyance direction by the first discharge roller pair 61 and the first reverse roller pair 62.

Thereafter, when the trailing end of the sheet S conveyed to the downstream side in the conveyance direction arrives at a position downstream of the flapper 83 in the conveyance direction, the flapper 83 is switched to the second position by the drive unit 84 to close the first discharge path P13, and the rotation direction of the first reverse roller pair is reversed to convey the sheet S to the upstream side in the conveyance direction. As a result, the flapper 83 at the second position may guide the sheet S to the second path P2 as shown in FIG. 13B.

In this manner, the drive unit 84 drives the flapper 83 to switch the flapper 83 between the first position and the second position, so that the sheet S conveyed to the upstream side in the conveyance direction by the first reverse roller 62 may be guided to the return path P3 or the second path P2. As a result, the conveyance destination of the sheet S may be easily switched.

Second Modification

In the embodiment described above, the conveyance destination of a sheet S is switched between the return path P3 and the second path P2 based on a position of the trailing end of the sheet S on the first path P1. When the sheet S is conveyed to the downstream side in the conveyance direction by the first reverse roller 62 and then is conveyed to the upstream side in the conveyance direction, the conveyance destination of the sheet S may be switched between the return path P3 and the second path P2 as follows.

The printer 1 shown in FIG. 14 includes a flapper 85. The flapper 85 is provided between the fixing unit 57 and the first reverse roller pair 62 on the first discharge path P13 of the first path P1, more specifically, between the connection position C1 and the connection position C3.

The flapper 85 may be moved between a first position (a position shown in FIG. 14B) where the first discharge path P13 is closed and a sheet conveyed to the upstream side in the conveyance direction by the first reverse roller pair 62 is guided to the second path P2 and a second position (a position shown in FIG. 14A) where the first discharge path P13 is opened and the sheet S may be conveyed along the first discharge path P13.

The flapper 85 is moved to the second position when the sheet S conveyed toward the downstream side in the conveyance direction along the first discharge path P13 comes into contact with the flapper 85, and is moved to the first position by a weight of the flapper 85 when a trailing end of the sheet S conveyed along the first discharge path P13 passes through the flapper 85 after a leading end of the sheet S conveyed toward the downstream side in the conveyance direction along the first discharge path P13 comes into contact with the flapper 85.

Figure 14A:
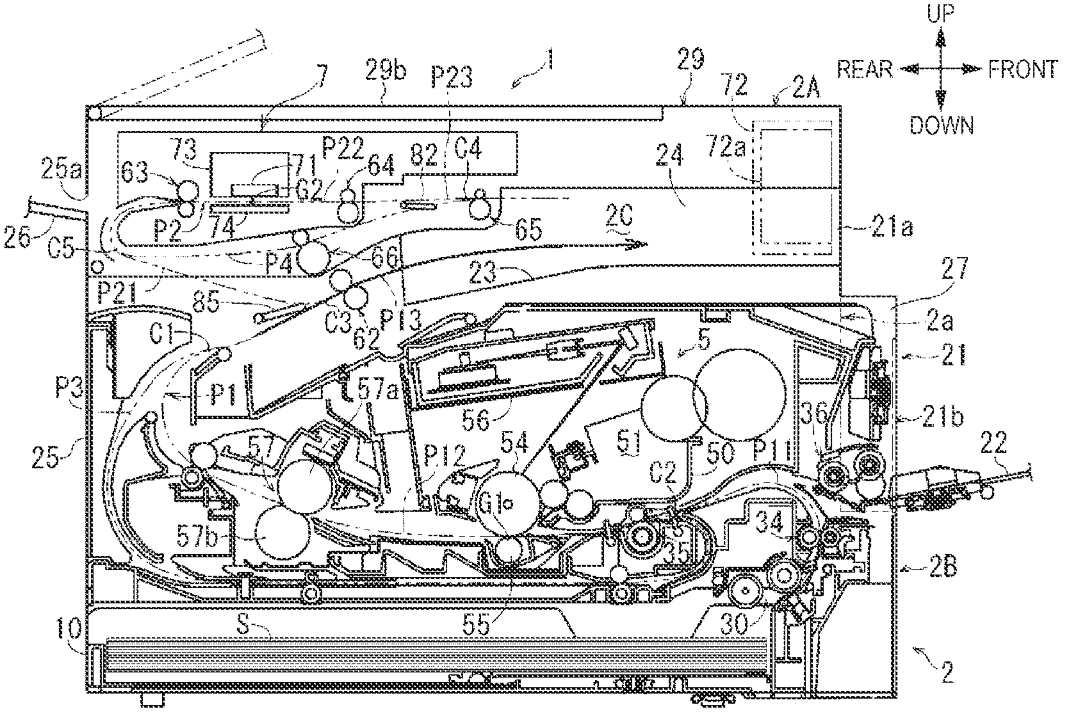
FIG. 14A is a side cross-sectional view showing a state in which the flapper opens the first discharge path and is moved to the second position where a sheet may be conveyed along the first discharge path.

In the printer 1 according to the present embodiment, when the sheet S conveyed to the upstream side in the conveyance direction by the first reverse roller pair 62 is guided to the return path P3, first, the sheet S conveyed from the image forming unit 5 to the first discharge path P13 is conveyed to the downstream side in the conveyance direction by the first discharge roller pair 61 and the first reverse roller pair 62. Thereafter, as shown in FIG. 14A, when the sheet S comes into contact with the flapper 85 and the flapper 85 is moved to the second position, the rotation direction of the first reverse roller pair is reversed to convey the sheet S to the upstream side in the conveyance direction. As a result, the flapper 85 at the second position may guide the sheet S to the return path P3.

Figure 14B:
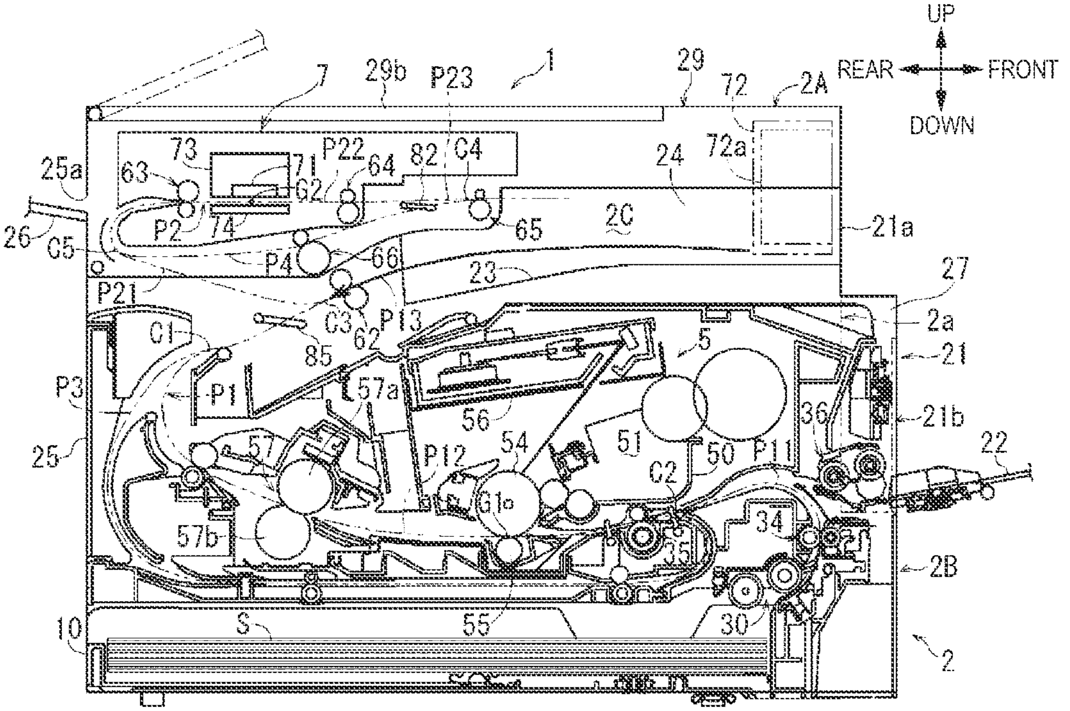
FIG. 14B is a side cross-sectional view showing a state in which the flapper closes the first discharge path and is moved to the first position where a sheet conveyed to the upstream side in the conveyance direction by the reverse roller pair is guided to the second path.

When the sheet S conveyed to the upstream side in the conveyance direction by the first reverse roller pair 62 is guided to the second path P2, first, the sheet S conveyed from the image forming unit 5 to the first discharge path P13 is conveyed to the downstream side in the conveyance direction by the first discharge roller pair 61 and the first reverse roller pair 62. Thereafter, as shown in FIG. 14B, when the sheet S passes through the flapper 85 and the flapper 85 is moved to the first position by the weight of the flapper 85, the rotation direction of the first reverse roller pair is reversed to convey the sheet S to the upstream side in the conveyance direction. As a result, the flapper 85 at the first position may guide the sheet S to the second path P2.

As described above, the flapper 85 may be moved between the first position and the second position according to a position where the sheet S is conveyed to the upstream side in the conveyance direction by the first reverse roller pair 62, and a guide destination of the sheet S conveyed to the upstream side in the conveyance direction by the first reverse roller pair 62 may be switched between the return path P3 and the second path P2 without using a drive unit that switches a position of the flapper 85. As a result, the conveyance destination of the sheet S may be easily switched.

Third Modification

Figure 15:
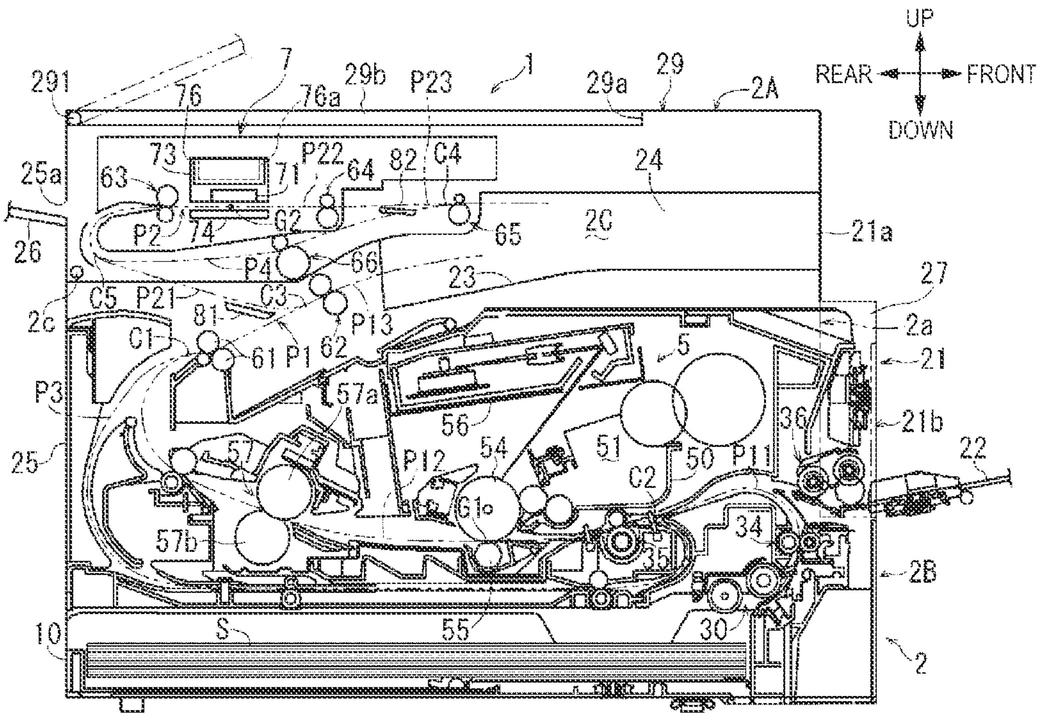
FIG. 15 is a side cross-sectional view showing the printer in which an ink containing chamber 76 is provided in a carriage to which the recording head is mounted.

Although the ink containing chamber 72 that contains ink to be supplied to the recording head 71 is disposed at a front side of the upper portion of the housing 2 in the embodiment described above, an ink containing chamber 76 may be provided on the carriage 73 to which the recording head 71 is mounted in the printer 1 shown in FIG. 15. The ink containing chamber 76 contains ink to be supplied to the recording head 71. In a case where the ink containing chamber 76 is provided on the carriage 73, the ink containing chamber 76 may be exposed to the outside through the upper face opening 29*a* when the upper face cover 29*b* of the housing 2 is moved to the first position. Therefore, in a state in which the upper face cover 29*b* is moved to the first position, the ink containing chamber 76 may be easily replenished with ink through the upper face opening 29*a*. The upper face cover 29*b* is an example of a cover that opens and closes an opening formed in the housing.

In the present embodiment, the ink containing chamber 76 has an ink cartridge 76*a* that may be attachable and detachable through the upper face opening 29*a*, and the ink containing chamber 76 may be replenished with ink by replacing the used ink cartridge 76*a* with a new ink cartridge 76*a*. In this manner, since the ink containing chamber 76 has the ink cartridge 76*a* that may be attachable and detachable through the upper face opening 29*a*, it is easy to replenish the ink containing chamber 76 with ink.

In the printer 1, the ink containing chamber 76 may be configured as an ink tank that may store ink, and the ink containing chamber 76 may be replenished with ink by connecting an ink replenishing container filled with ink to the ink containing chamber 76 and injecting the ink in the ink replenishing container into the ink containing chamber 76.

The ink containing chamber 76 may be provided at a position other than a position on the carriage 73 as long as the ink containing chamber 76 may be exposed to the outside through the upper face opening 29*a* when the upper face cover 29*b* is moved to the first position. In this manner, since the ink containing chamber 76 is provided at a position where the ink containing chamber 76 may be exposed to the outside when the upper face cover 29*b* is moved to the first position, the ink containing chamber 76 may be easily replenished with ink.

Second Embodiment

Figure 16:
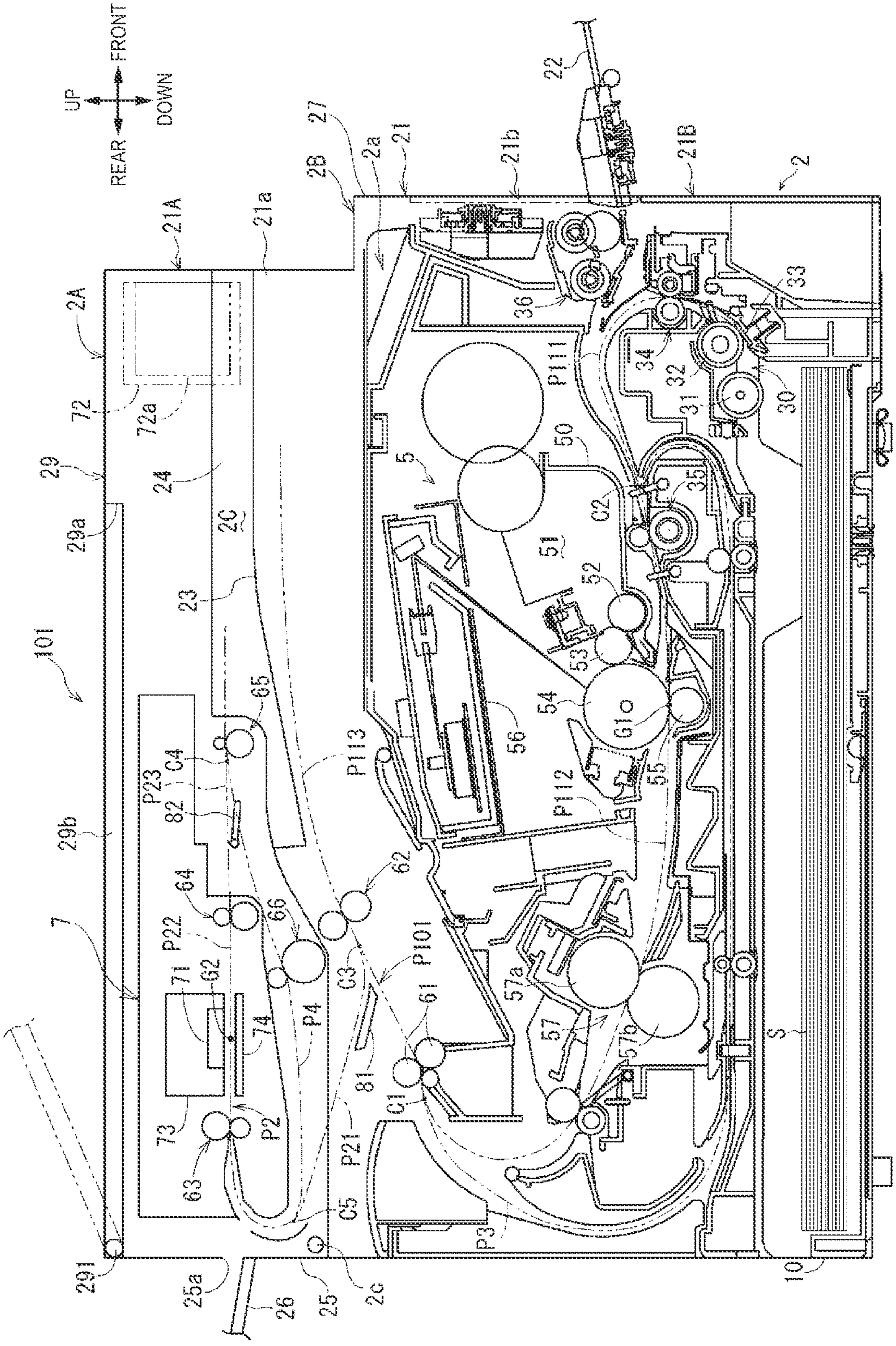
FIG. 16 is a side cross-sectional view showing another configuration of the printer in FIG. 1.

A printer 101 shown in FIG. 16 is different from the printer 1 in that the printer 101 includes a first path P101 along which a sheet S on which an image is formed by the image forming unit 5 is conveyed, and a first discharge path P113 of the first path P101 is disposed below the discharge tray 23. In the second embodiment, the sheet S that passed through the image recording position G2 of the recording unit 7 is discharged to the discharge tray 23. In the printer 101, the image recording position G2 of the recording unit 7 is located above the image forming position G1 of the image forming unit 5.

The first path P101 extends from the sheet cassette 10, passes through the image forming unit 5, and extends to a lower side of the discharge tray 23. The first path P101 includes a first sheet feeding path P111 for feeding the sheet S from the sheet cassette 10 to the image forming unit 5, a first conveyance path P112 for conveying the sheet S in the image forming unit 5, and the first discharge path P113 for conveying the sheet S discharged from the image forming unit 5.

The first discharge roller pair 61 and the first reverse roller pair 62 are disposed on the first discharge path P113, and the first discharge path P113 is connected to the second path P2 at the connection position C3 between the first discharge roller pair 61 and the first reverse roller pair 62. The first discharge path P113 extends forward than the first reverse roller pair 62, and a portion of the first discharge path P113 extending forward than the first reverse roller pair 62 is located below the discharge tray 23.

In the printer 101, the sheet S contained in the sheet cassette 10 is conveyed along the first sheet feeding path P111 by the first sheet feeding unit 30 and is fed to the image forming unit 5. The sheet S fed to the image forming unit 5 is conveyed along the first conveyance path P112 and passes through the image forming unit 5, and then is conveyed to the downstream side in the conveyance direction along the first discharge path P113 by the first discharge roller pair 61 and the first reverse roller pair 62. The sheet S conveyed to the downstream side in the conveyance direction along the first discharge path P113 by the first reverse roller pair 62 is conveyed to a lower side of the discharge tray 23.

Thereafter, the rotation direction of the first reverse roller pair 62 is reversed, and the sheet S is conveyed to the upstream side in the conveyance direction and is guided from the connection position C3 to the second path P2. The sheet S guided to the second path P2 is conveyed while being bent into a U shape in the curved path P21 of the second path P2, then the sheet S is conveyed along the second conveyance path P22 and the second discharge path P23, and is discharged to the discharge tray 23.

In this manner, the sheet S that passed through the image forming unit 5 is conveyed to the downstream side in the conveyance direction along the first discharge path P113, and then the sheet S is conveyed to the upstream side in the conveyance direction. The sheet S conveyed to the upstream side in the conveyance direction is bent into a U shape by the curved path P21 of the second path P2 and is conveyed to the recording unit 7, so that a length of a conveyance path of the sheet S from the image forming unit 5 to the recording unit 7 may be ensured.

Accordingly, the image forming unit 5 and the recording unit 7 may be disposed in a manner of being close to each other in the upper-lower direction, and the size of the printer 101 in the upper-lower direction may be reduced. Since the sheet S conveyed to the downstream side in the conveyance direction along the first discharge path P113 by the first reverse roller pair 62 is conveyed to the lower side of the discharge tray 23, it is possible to prevent a user from mistakenly taking out the sheet S conveyed to the downstream side in the conveyance direction.

Third Embodiment

Figure 17:
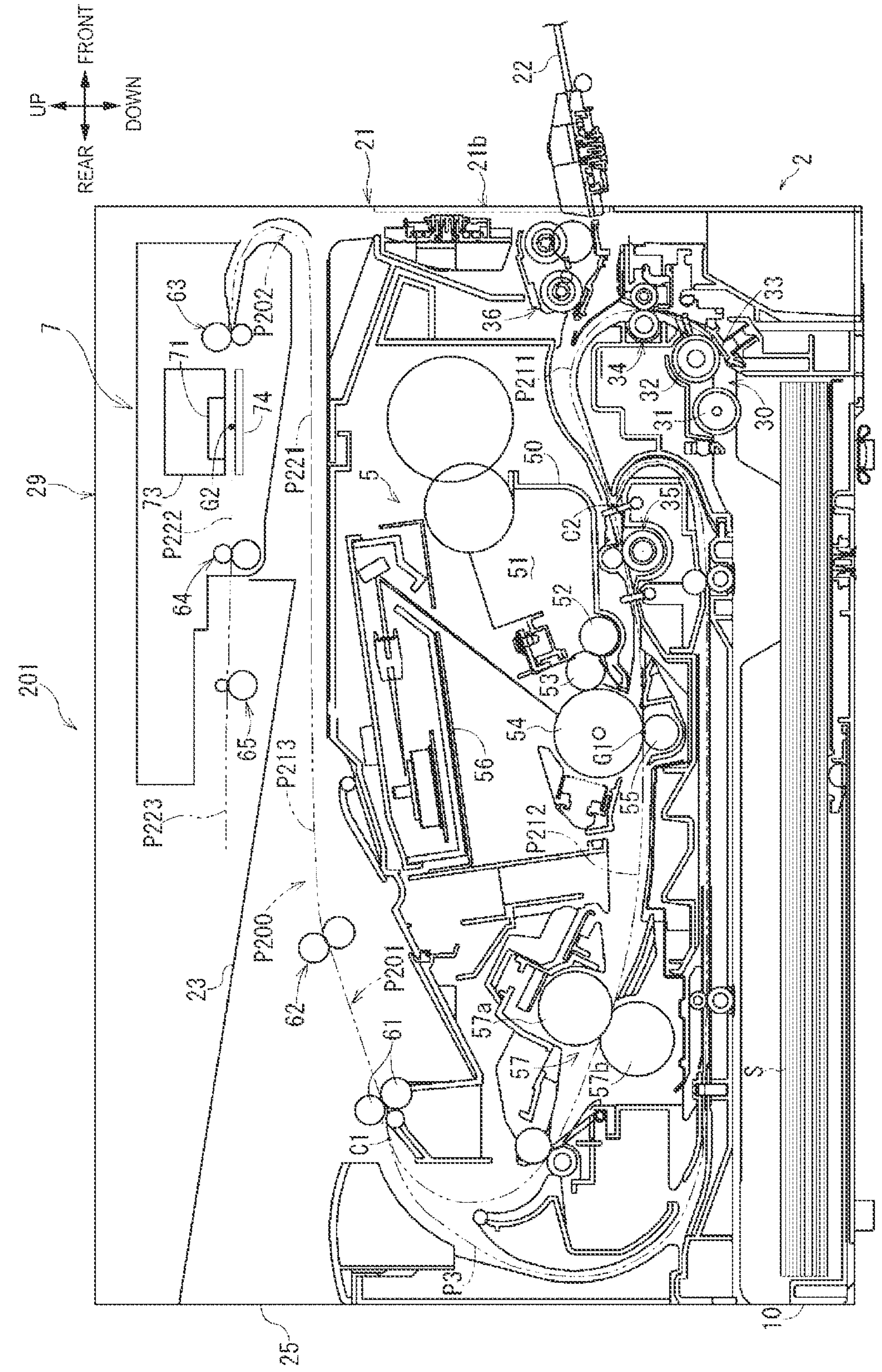
FIG. 17 is a side cross-sectional view showing another configuration of the printer in FIG. 1.

A printer 201 shown in FIG. 17 includes the image forming unit 5 and the recording unit 7, and the image recording position G2 of the recording unit 7 is located above the image forming position G1 of the image forming unit 5. The image recording position G2 of the recording unit 7 is located at a front portion of the housing 2 in the front-rear direction. The discharge tray 23 is disposed rearward than the image recording position G2 of the recording unit 7.

The printer 201 has a conveyance path P200. The image forming unit 5 is configured to form an image on a sheet S conveyed along the conveyance path P200, and the recording unit 7 is configured to record an image on the sheet S conveyed along the conveyance path P200. The conveyance path P200 includes a first path P201 and a second path P202 disposed downstream of the first path P201 in the conveyance direction of the sheet S. The image forming unit 5 forms an image on the sheet S conveyed along the first path P201, and the recording unit 7 records an image on the sheet S conveyed along the second path P202.

The first path P201 extends from the sheet cassette 10, passes through the image forming unit 5, and extends to an upper side of the image forming unit 5. The first path P201 includes a first sheet feeding path P211 for feeding the sheet S from the sheet cassette 10 to the image forming unit 5, a first conveyance path P212 for conveying the sheet S in the image forming unit 5, and a first curved path P213 for conveying the sheet S from the image forming unit 5 to an upper side of the image forming unit 5.

The first sheet feeding path P211 is formed in the same manner as the first sheet feeding path P11, and the first conveyance path P212 is formed in the same manner as the first conveyance path P12. The first curved path P213 is formed to be continuous with the first conveyance path P212. The first curved path P213 extends rearward and upward, then is curved into a U shape, and extends forward and upward. That is, the first curved path P213 is curved into a U shape upward from the image forming position G1 of the image forming unit 5.

The second path P202 is formed to be continuous with the first path P201, and the second path P202 passes through the recording head 71 and extends to the discharge tray 23. The second path P202 includes a second curved path P221 for conveying the sheet S from a downstream end in the conveyance direction of the first path P201 toward the recording head 71, a second conveyance path P222 for conveying the sheet S between the second conveyance roller pair 63 and the second discharge roller pair 64, and a second discharge path P223 for discharging the sheet S that passed through the recording head 71 to the discharge tray 23.

The second curved path P221 extends forward from the downstream end in the conveyance direction of the first path P201, then is curved into a U shape, extends rearward, and extends toward the image recording position G2 of the recording unit 7. That is, the second curved path P221 is located downstream of the first curved path P213 in the conveyance direction, extends upward, and is curved into a U shape toward the image recording position G2 of the recording unit 7.

The second conveyance path P222 is a path that is continuous with the second curved path P221 and is disposed between the second conveyance roller pair 63 and the second discharge roller pair 64, and extends rearward from the second conveyance roller pair 63 toward the second discharge roller pair 64. The second discharge path P223 is formed to be continuous with the second conveyance path P222, and extends rearward from the second discharge roller pair 64.

In the printer 201, the sheet S contained in the sheet cassette 10 is conveyed along the first sheet feeding path P211 by the first sheet feeding unit 30 and is fed to the image forming unit 5. The sheet S fed to the image forming unit 5 is conveyed along the first conveyance path P212, passes through the image forming unit 5, and then is conveyed to the downstream side in the conveyance direction along the first curved path P213 by the first discharge roller pair 61 and the first reverse roller pair 62.

Thereafter, the sheet S is taken over and conveyed from the first curved path P213 to the second curved path P221 of the second path P202, and is bent into a U shape in the second curved path P221. Thereafter, the sheet S is conveyed along the second conveyance path P222 and the second discharge path P223, and is discharged to the discharge tray 23. In the present embodiment, the sheet S that passed through the image recording position G2 of the recording unit 7 is discharged to the discharge tray 23.

In this manner, the sheet S passes through the first curved path P213 and the second curved path P221 from the image forming unit 5, is curved into a U shape, and is conveyed to the recording unit 7, so that a length of a path for conveying the sheet S from the image forming unit 5 to the recording unit 7 may be ensured. Accordingly, the image forming unit 5 and the recording unit 7 may be disposed in a manner of being close to each other in the upper-lower direction, and the size of the printer 201 in the upper-lower direction may be reduced.

Fourth Embodiment

Figure 18:
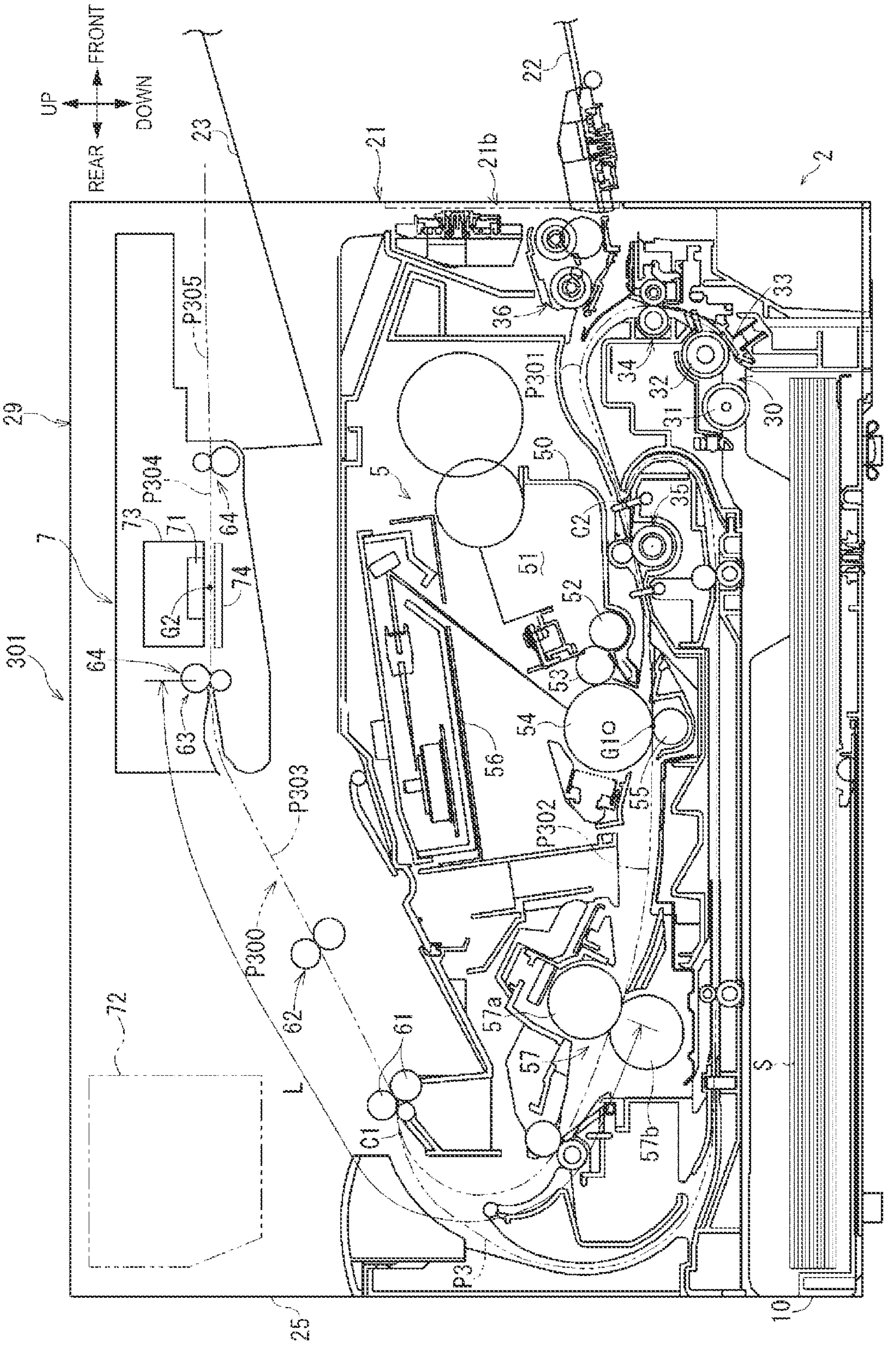
FIG. 18 is a side cross-sectional view showing another configuration of the printer in FIG. 1.

A printer 301 shown in FIG. 18 includes the image forming unit 5 and the recording unit 7, and the image recording position G2 of the recording unit 7 is located above the image forming position G1 of the image forming unit 5. The image recording position G2 of the recording unit 7 is located at a front portion of the housing 2 in the front-rear direction. The ink containing chamber 72 of the recording unit 7 is disposed at an upper portion and a rear end portion of the housing 2. The discharge tray 23 is disposed in front of the image recording position G2 of the recording unit 7.

The printer 301 has a conveyance path P300. The image forming unit 5 is configured to form an image on a sheet S conveyed along the conveyance path P300, and the recording unit 7 is configured to record an image on the sheet S conveyed along the conveyance path P300. The recording unit 7 is configured to record an image on the sheet S after the sheet S is conveyed through the image forming position G1 of the image forming unit 5.

The conveyance path P300 extends from the sheet cassette 10, passes through the image forming unit 5, and extends to an upper side of the image forming unit 5. Further, the conveyance path P300 extends from the upper side of the image forming unit 5, passes through the recording head 71, and extends to the discharge tray 23. The conveyance path P300 includes a first sheet feeding path P301 for feeding the sheet S from the sheet cassette 10 to the image forming unit 5, a first conveyance path P302 for conveying the sheet S in the image forming unit 5, a connection path P303 for connecting the image forming unit 5 and the recording unit 7, a second conveyance path P304 for conveying the sheet S in the recording unit 7, and a discharge path P305 for discharging the sheet S that passed through the recording head 71 of the recording unit 7 to the discharge tray 23.

The first sheet feeding path P301 is formed in the same manner as the first sheet feeding path P11, and the first conveyance path P302 is formed in the same manner as the first conveyance path P12. The connection path P303 is formed to be continuous with the first conveyance path P302, extends rearward and upward, then is curved into a U shape, extends forward and upward, and extends toward the image recording position G2 of the recording unit 7. The second conveyance path P304 is a path that is continuous with the connection path P303 and is disposed between the second conveyance roller pair 63 and the second discharge roller pair 64, and the second conveyance path P304 extends forward from the second conveyance roller pair 63 toward the second discharge roller pair 64. The discharge path P305 is formed to be continuous with the second conveyance path P304, and extends forward from the second discharge roller pair 64.

The heating roller 57*a* and the pressurizing roller 57*b* of the fixing unit 57 are disposed at an upstream end in the conveyance direction of the connection path P303, and the second conveyance roller pair 63 is disposed at the downstream end in the conveyance direction of the connection path P303. The first discharge roller pair 61 and the first reverse roller pair 62 are disposed between the heating roller 57*a* and the second conveyance roller pair 63 and between the pressurizing roller 57*b* and the second conveyance roller pair 63 in the connection path P303.

The heating roller 57*a* and the pressurizing roller 57*b* are examples of a fixing roller for fixing an image on a sheet on which an image is formed by the image forming unit. The second conveyance roller pair 63 is disposed downstream of the fixing roller in the conveyance direction, and is an example of a conveyance roller that conveys a sheet to the image recording position G2 of the recording unit.

In the printer 301, the sheet S contained in the sheet cassette 10 is conveyed along the first sheet feeding path P301 by the first sheet feeding unit 30 and is fed to the image forming unit 5. The sheet S fed to the image forming unit 5 is conveyed along the first conveyance path P302, passes through the image forming unit 5, and then is conveyed to the downstream side in the conveyance direction along the connection path P303 by the first discharge roller pair 61 and the first reverse roller pair 62.

The sheet S conveyed along the connection path P303 is conveyed to the image recording position G2 of the recording unit 7 by the second conveyance roller pair 63. The sheet S conveyed to the image recording position G2 of the recording unit 7 is conveyed along the second conveyance path P304 and the discharge path P305, and is discharged to the discharge tray 23.

In the present embodiment, the sheet S that passed through the image recording position G2 of the recording unit 7 is discharged to the discharge tray 23.

In the printer 301, a distance L from the heating roller 57*a* and the pressurizing roller 57*b* to the second conveyance roller pair 63 in the conveyance direction of the sheet S is larger than a maximum size of a sheet on which an image may be recorded by the recording unit 7, that is, a maximum length in the conveyance direction of the sheet S.

In the printer 301, the sheet S on which an image is formed by the image forming unit 5 is conveyed at a constant speed along the conveyance path P300, and the sheet S on which an image is recorded by the recording unit 7 is intermittently conveyed along the conveyance path P300. Therefore, since the distance L from the heating roller 57*a* and the pressurizing roller 57*b* to the second conveyance roller pair 63 is set to be larger than the maximum size of a sheet on which an image may be recorded by the recording unit 7, the conveyance of the sheet S in the image forming unit 5 and the conveyance of the sheet S in the recording unit 7 do not interfere with each other, and it is not necessary to perform control to intermittently drive the heating roller 57*a* in accordance with the second conveyance roller pair 63 of the recording unit 7.

Since the recording unit 7 forms an image on the sheet S conveyed through the image forming position G1 of the image forming unit 5, the image forming unit 5 may form an image on the sheet S and the recording unit 7 may record an image on the same sheet S.

Fifth Embodiment

Figure 19:
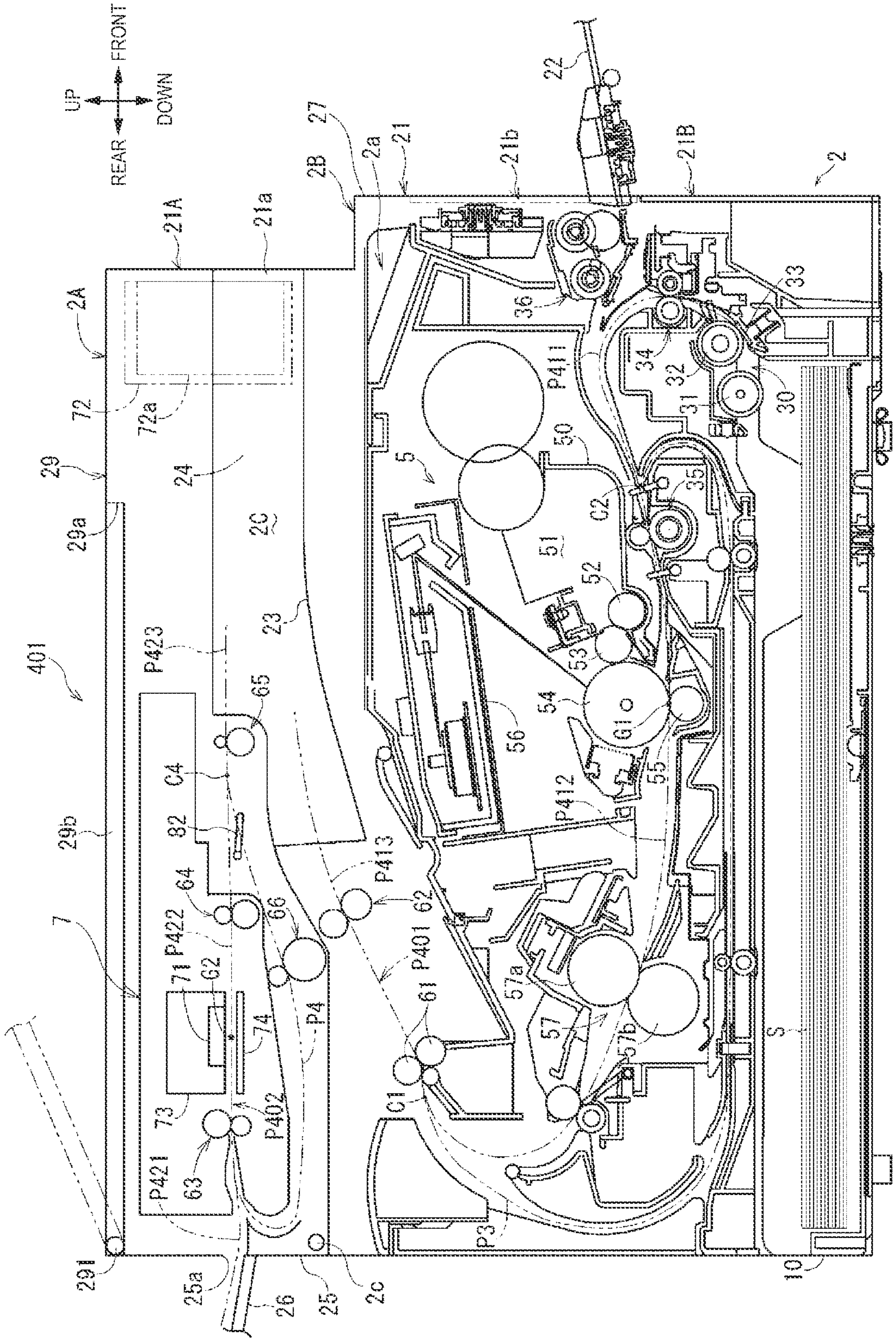
FIG. 19 is a side cross-sectional view showing another configuration of the printer in FIG. 1.

A printer 401 shown in FIG. 19 has a first path P401 along which a sheet S on which an image is formed by the image forming unit 5 is conveyed, and a second path P402 along which the sheet S on which an image is recorded by the recording unit 7 is conveyed. In the printer 401, the image recording position G2 of the recording unit 7 is located above the image forming position G1 of the image forming unit 5.

The printer 401 includes the sheet cassette 10 that contains the sheet S to be supplied to the first path P401, the first discharge roller pair 61 that is disposed downstream of the image forming unit 5 in the conveyance direction of the sheet S on the first path P401 and that discharges the sheet S, the second sheet tray 26 that supports the sheet S to be supplied to the second path P402, and the second discharge roller pair 64 that is disposed downstream of the recording unit 7 in the conveyance direction on the second path P402 and that discharges the sheet S.

The printer 401 is configured such that the sheet S on which an image is recorded by the recording unit 7 is not supplied along the first path P401 and the sheet S supported by the second sheet tray 26 is supplied. In the present embodiment, the sheet S that passed through the image forming position G1 of the image forming unit 5 and the sheet S that passed through the image recording position G2 of the recording unit 7 are discharged to the discharge tray 23.

The first path P401 extends from the sheet cassette 10, passes through the image forming unit 5, and extends to the discharge tray 23. The first path P401 includes a first sheet feeding path P411 for feeding the sheet S from the sheet cassette 10 to the image forming unit 5, a first conveyance path P412 for conveying the sheet S in the image forming unit 5, and a first discharge path P413 for conveying the sheet S discharged from the image forming unit 5. The first discharge roller pair 61 and the first reverse roller pair 62 are disposed on the first discharge path P413.

In the printer 401, the sheet S contained in the sheet cassette 10 is conveyed along the first sheet feeding path P411 by the first sheet feeding unit 30 and is fed to the image forming unit 5. The sheet S fed to the image forming unit 5 is conveyed along the first conveyance path P412 and passes through the image forming unit 5, then is conveyed to the downstream side in the conveyance direction along the first discharge path P413 by the first discharge roller pair 61 and the first reverse roller pair 62, and is discharged to the discharge tray 23.

The second path P402 extends from the second sheet tray 26, passes through the recording head 71, and extends to the discharge tray 23. The second path P402 includes a second sheet feeding path P421 for feeding the sheet S supported by the second sheet tray 26 to the image recording position G2 of the recording unit 7, a second conveyance path P422 for conveying the sheet S between the second conveyance roller pair 63 and the second discharge roller pair 64, and a second discharge path P423 for discharging the sheet S that passed through the recording head 71 to the discharge tray 23.

The second sheet feeding path P421 extends forward from the second sheet tray 26 toward the image recording position G2 of the recording unit 7. The second conveyance path P422 is a path that is continuous with the second sheet feeding path P421 and is disposed between the second conveyance roller pair 63 and the second discharge roller pair 64. The second conveyance path P422 extends forward from the second conveyance roller pair 63 toward the second discharge roller pair 64. The second discharge path P423 is formed to be continuous with the second conveyance path P422, and extends forward from the second discharge roller pair 64.

In the printer 401, the sheet S supported by the second sheet tray 26 is conveyed along the second sheet feeding path P421 by the second conveyance roller pair 63 and is fed to the recording unit 7. The sheet S fed to the recording unit 7 is conveyed along the second conveyance path P422 by the second conveyance roller pair 63 and passes through the image forming unit 5, then is conveyed to the downstream side in the conveyance direction along the second discharge path P423 by the second discharge roller pair 64 and the second reverse roller pair 65, and is discharged to the discharge tray 23.

Since the sheet cassette 10 that contains the sheet S to be supplied to the first path P401 and the second sheet tray 26 that supports the sheet S to be supplied to the second path P402 are independent of each other in the present embodiment, the image forming unit 5 and the recording unit 7 may be disposed in a manner of being close to each other in the upper-lower direction, and the size of the printer 1 may be reduced.

Sixth Embodiment

Figure 20:
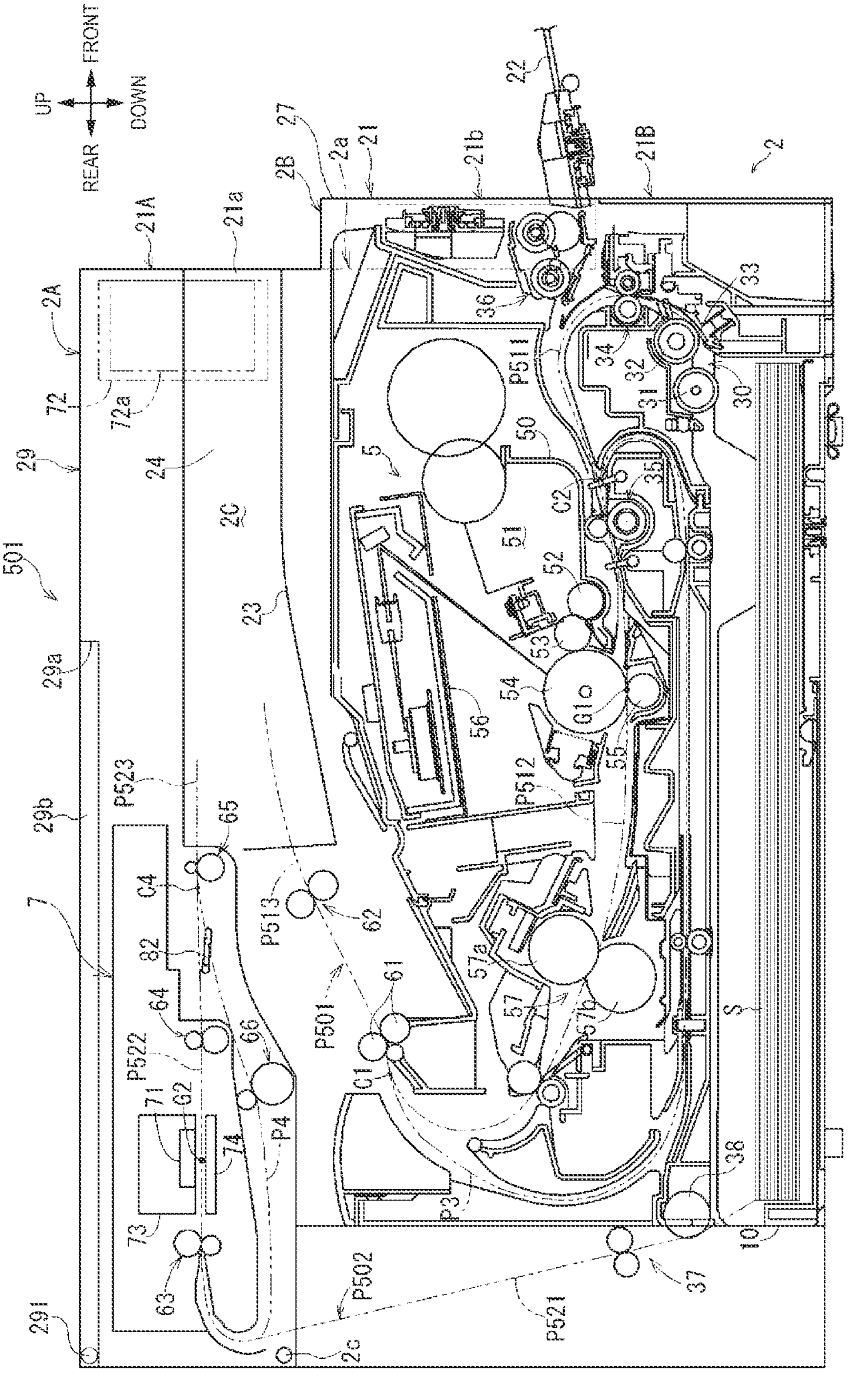
FIG. 20 is a side cross-sectional view showing another configuration of the printer in FIG. 1.

A printer 501 shown in FIG. 20 has a first path P501 along which a sheet S on which an image is formed by the image forming unit 5 is conveyed, and a second path P502 along which the sheet S on which an image is recorded by the recording unit 7 is conveyed. In the printer 501, the image recording position G2 of the recording unit 7 is located above the image forming position G1 of the image forming unit 5.

The printer 501 includes the sheet cassette 10 that contains sheets S, the first sheet feeding unit 30 for feeding a sheet to the first path P501 from the sheet cassette 10, and a second sheet feeding unit 37 for feeding a sheet to the second path P502 from the sheet cassette 10. The second sheet feeding unit 37 includes a second sheet feeding roller 38. The second sheet feeding roller 38 feeds the sheet S supported by the sheet cassette 10 to the second path P502. The second sheet feeding unit 37 is disposed rearward of the first sheet feeding unit 30 in the front-rear direction. The second sheet feeding roller 38 is disposed rearward of the first sheet feeding roller 31 in the front-rear direction. In the present embodiment, the sheet S that passed through the image forming position G1 of the image forming unit 5 and the sheet S that passed through the image recording position G2 of the recording unit 7 are discharged to the discharge tray 23.

The first path P501 extends from the sheet cassette 10, passes through the image forming unit 5, and extends to the discharge tray 23. The first path P501 includes a first sheet feeding path P511 for feeding the sheet S from the sheet cassette 10 to the image forming unit 5, a first conveyance path P512 for conveying the sheet S in the image forming unit 5, and a first discharge path P513 for conveying the sheet S discharged from the image forming unit 5. The first discharge roller pair 61 and the first reverse roller pair 62 are disposed on the first discharge path P513.

In the printer 501, the sheet S contained in the sheet cassette 10 is conveyed along the first sheet feeding path P511 by the first sheet feeding unit 30 and is fed to the image forming unit 5. The sheet S fed to the image forming unit 5 is conveyed along the first conveyance path P512 and passes through the image forming unit 5, then is conveyed to the downstream side in the conveyance direction along the first discharge path P513 by the first discharge roller pair 61 and the first reverse roller pair 62, and is discharged to the discharge tray 23.

The second path P502 extends from the sheet cassette 10, passes through the recording head 71, and extends to the discharge tray 23. The second path P502 includes a second sheet feeding path P521 for feeding the sheet S contained in the sheet cassette 10 to the image recording position G2 of the recording unit 7, a second conveyance path P522 for conveying the sheet S between the second conveyance roller pair 63 and the second discharge roller pair 64, and a second discharge path P523 for discharging the sheet S that passed through the recording head 71 to the discharge tray 23.

The second sheet feeding path P521 extends upward from the sheet cassette 10 and then is bent forward toward the image recording position G2 of the recording unit 7. The second conveyance path P522 is a path that is continuous with the second sheet feeding path P521 and is disposed between the second conveyance roller pair 63 and the second discharge roller pair 64. The second conveyance path P522 extends forward from the second conveyance roller pair 63 toward the second discharge roller pair 64. The second discharge path P523 is formed to be continuous with the second conveyance path P522, and extends forward from the second discharge roller pair 64.

In the printer 501, the sheet S contained in the sheet cassette 10 is conveyed along the second sheet feeding path P521 by the second sheet feeding unit 37 and is fed to the recording unit 7. The sheet S fed to the recording unit 7 is conveyed along the second conveyance path P522 by the second conveyance roller pair 63 and passes through the image forming unit 5, then is conveyed to the downstream side in the conveyance direction along the second discharge path P523 by the second discharge roller pair 64 and the second reverse roller pair 65, and is discharged to the discharge tray 23.

Since the first sheet feeding unit 30 and the second sheet feeding unit 37 that are independent of each other may feed sheets S respectively to the first path P501 and the second path P502 from the sheet cassette 10 that is a common sheet tray in the present embodiment, the image forming unit 5 and the recording unit 7 may be disposed in a manner of being close to each other in the upper-lower direction, and the size of the printer 501 may be reduced.

What is claimed is:

1. A printer comprising:

a photosensitive drum on which a toner image to be transferred onto a sheet is formed on a face of the photosensitive drum; and a recording head configured to eject ink onto a sheet, wherein the recording head is located above the photosensitive drum, the photosensitive drum is configured to form the image on the sheet conveyed along a first path, the recording head is configured to record the image on the sheet red along a second path, the printer further comprises a reverse roller that is provided on the first path, disposed downstream of the photosensitive drum in a conveyance direction, configured to convey the sheet to both a downstream side and an upstream side in conveyance direction, the first path is connected to the second path at a connection position between the photosensitive drum and the reverse roller on the first path, the reverse roller is configured to convey the sheet to the downstream side in the conveyance direction and then convey the sheet to the upstream side in the conveyance direction so as to convey the sheet to the second path, and the recording bead is disposed above the reverse roller.

2. The printer according to claim 1, wherein the second path has a curved path that is curved into a U shape and extends from the connection position to the image recording position of the recording head.

3. The printer according to claim 2 further comprising:

a discharge tray to which the sheet that passed through the second path is discharged, wherein the reverse roller is configured to convey the sheet to a lower side of the discharge tray and the downstream side in the conveyance direction, and then convey the sheet to the upstream side in the conveyance direction, so as to convey the sheet toward the second path.

4. The printer according to claim 1, further comprising a discharge tray to which the sheet conveyed to the downstream side in the conveyance direction by the reverse roller is discharged.

5. The printer according to claim 4, wherein the sheet that passed through the second path is discharged to the discharge tray.

6. The printer according to claim 1, wherein the first path is connected to a return path at a position between the photosensitive drum and the reverse roller on the first path, and the return path is a path for returning the sheet to a position upstream of the photosensitive drum on the first path, and the reverse roller conveys the sheet to the return path by conveying the sheet to the upstream side in the conveyance direction based on a determination that a trailing end of the sheet is located at a first position on the first path, or the second path by conveying the sheet to the upstream side in the conveyance direction based on a determination that a trailing end of the sheet is located at a second position that is a position different from the first position on the first path.

7. The printer according to claim 1 further comprising:

a flapper movable between a first position where the sheet conveyed to the upstream side in the conveyance direction by the reverse roller is guided to the return path and a second position where the sheet conveyed to the upstream side in the conveyance direction by the reverse roller is guided to the second path; and an actuator configured to switch a position of the flapper between the first position and the second position, wherein the first path is connected to the return path at a position between the photosensitive drum and the reverse roller on the first path, and the return path is a path for returning the sheet to a position upstream of the photosensitive drum on the first path.

8. The printer according to claim 1 further comprising:

a flapper movable between a first position where the flapper intersects with the first path and the sheet conveyed to the upstream side in the conveyance direction by the reverse roller is guided to the second path and a second position where the flapper does not intersect with the first path and the sheet is conveyable along the first path, wherein the first path is connected to the return path at a position between the photosensitive drum and the reverse roller on the first path, and the return path is a path for returning a sheet to a position upstream of the image forming position of the photosensitive drum on the first path, the flapper is moved to the second position when a sheet conveyed along the first path comes into contact with the flapper, and after a leading end of the sheet conveyed along the first path comes into contact with the flapper, the flapper is moved to the first position by a weight of the flapper when a trailing end of the sheet conveyed along the first path passes through the flapper, and the sheet conveyed along the first path is guided to the return path when the sheet is conveyed to the upstream side in the conveyance direction by the reverse roller in a state in which the sheet comes into contact with the flapper and the flapper is moved to the second position, and the sheet conveyed along the first path is guided to the second path when the sheet is conveyed to the upstream side in the conveyance direction by the reverse roller in a state in which a trailing end of the sheet passes through the flapper and the flapper is moved to the first position.

9. The printer according to claim 1, wherein the photosensitive drum is configured to form the image on the sheet conveyed along the first path, and the recording head is configured to records the image on the sheet conveyed along the second path, and a maximum distance between rollers adjacent to each other in the conveyance direction among a plurality of sheet conveyance rollers disposed on the second path is smaller than a maximum distance between rollers adjacent to each other in the conveyance direction among a plurality of sheet conveyance rollers disposed on the first path.

10. The printer according to claim 1 further comprising:

a most downstream roller that is located at a most downstream side in the conveyance direction of a sheet on the first path; and a re-conveyance roller that is disposed on a re-conveyance path and configured to conveys a sheet toward the second path, wherein the photosensitive drum is configured to form an image on the sheet conveyed along the first path, the recording head is configured to record an image on the sheet conveyed along the second path, the second path is connected to the re-conveyance path for guiding the sheet conveyed along the second path to the second path again, and the re-conveyance roller is disposed at a position different from a position of the most downstream roller in the conveyance direction of a sheet conveyed by the most downstream roller.

11. The printer according to claim 1 further comprising:

a housing that houses the photosensitive drum and the recording head;

a first sheet tray that supports the sheet to be supplied the photosensitive drum; and a second sheet tray that supports the sheet to be supplied to the image recording position of the recording head, wherein the first sheet tray is disposed at one side portion of the housing, and the second sheet tray is disposed at the other side that is opposite to the one side of the housing.

12. The printer according to claim 1 further comprising:

a discharge tray to which the sheet conveyed along the first path and the sheet conveyed along the second path are discharged, wherein the photosensitive drum is configured to form the image on the sheet conveyed along the first path, and the recording head is configured to record the image on the sheet conveyed along the second path.

13. The printer according to claim 12 further comprising:

a housing that houses the photosensitive drum and the recording head, wherein the housing includes an opening provided on a front face of the printer, and a discharge space to which the sheet conveyed along the first path and the sheet conveyed along the second path are discharged toward the opening, and the discharge tray defines a lower side of the discharge space.

14. The printer according to claim 13, wherein the housing has a cut-out portion in a width direction orthogonal to a discharge direction of the sheet, and the cut-out portion is recessed toward an upstream side in the discharge direction at a position adjacent to the discharge tray.

15. The printer according to claim 13, wherein the front face of the housing has a first face on which the opening is formed, and a second face located below the first face, and the first face is located upstream of the second face in the discharge direction.

16. The printer according to claim 13, wherein the housing includes a first housing that defines at least an upper side of the discharge space, and a second housing located below the first housing, and the first housing is movable between a first position and a second position where a distance between the first housing and the discharge tray is larger than a distance between the first housing and the discharge tray at the first position.

17. The printer according to claim 12, wherein the discharge tray is colored with a color different from a color of an outer face of the housing.

18. The printer according to claim 12 further comprising:

a first most downstream roller that is located at a most downstream side in the conveyance direction of the sheet on the first path and that is configured to discharge the sheet to the discharge tray; and a second most downstream roller that is located at a most downstream side in the conveyance direction of a sheet on the second path and that is configured to discharge the sheet to the discharge tray, wherein a distance between the second most downstream roller and a downstream end in the conveyance direction of the discharge tray is shorter than a distance between the first most downstream roller and the downstream end in the conveyance direction of the discharge tray.

19. The printer according to claim 1, wherein the photosensitive drum and the recording head are configured to form an image on a sheet conveyed along a conveyance path, and the conveyance path includes a first curved path that extends upward from the photosensitive drum and is curved into a U shape, and a second curved path that is located downstream of the first curved path in the conveyance direction, extends upward toward the recording head, and is curved into a U shape.

20. The printer according to claim 1, wherein the recording head records an image on a sheet conveyed through the photosensitive drum.

21. The printer according to claim 20 further comprising:

a fixing roller that is disposed downstream of the photosensitive drum in the conveyance direction, and fixes an image on the sheet on which the image was formed by the photosensitive drum; and a conveyance roller that is disposed downstream of the fixing roller in the conveyance direction and conveys the sheet to the recording head, wherein a distance from the fixing roller to the conveyance roller in the conveyance direction is larger than a maximum size of the sheet on which the image is recorded by the recording head.

22. The printer according to claim 1 further comprising:

a first sheet tray that is configured to holds a first sheet to be supplied to the first path;

a first discharge roller that is disposed downstream of the photosensitive drum in the conveyance direction of the sheet on the first path and configured to discharge the first sheet;

a second sheet tray that supports a second sheet to be supplied to the second path; and a second discharge roller that is disposed downstream of the recording head in the conveyance direction on the second path and configured to discharge the second sheet, wherein the photosensitive drum is configured to form the image on the first sheet conveyed along the first path, and the recording head records the image on the second sheet conveyed along the second path.

23. The printer according to claim 1 further comprising:

a sheet tray that holds the sheet;

a first sheet feeding roller configured to feed the sheet from the sheet tray to the first path; and a second sheet feeding roller configured to feed the sheet from the sheet tray to the second path, wherein the photosensitive drum forms the image on the sheet conveyed along the first path, and the recording head records the image on the sheet conveyed along the second path.

24. The printer according to claim 1 further comprising:

a housing that houses the photosensitive drum and the recording head;

a first cover configured to open and close a first opening formed in the housing;

a first operation portion for opening and closing the first cover;

a second cover configured to open and close a second opening formed in the housing; and a second operation portion for opening and closing the second cover, wherein toner is configured to be replenished to a toner containing portion that contains toner in an open state of the first cover, ink is configured to be replenished to an ink containing portion that contains ink in an open state of the second cover, and the first operation portion and the second operation portion are disposed at one side of the housing in a horizontal direction.

25. The printer according to claim 24, wherein the toner containing portion includes a toner cartridge that is attachable and detachable through the first opening, and the ink containing portion includes an ink cartridge that is attachable and detachable through the second opening.

26. The printer according to claim 24 further comprising:

a discharge tray to which the sheet on which the image is formed by the photosensitive drum or the sheet on which the image is recorded by the recording head is discharged, wherein the horizontal direction is a direction orthogonal to the discharge direction of a sheet, and the first operation portion and the second operation portion are located at positions different from the discharge tray in the horizontal direction.

27. The printer according to claim 1 further comprising:

a housing that houses the photosensitive drum and the recording head;

a first cover configured to open and close a first opening formed in the housing;

a first operation portion for opening and closing he first cover;

a second cover configured to open and close a second opening formed in the housing; and a second operation portion for opening and closing the second cover, wherein toner is configured to be replenished to a toner containing portion that contains toner in an open state of the first cover, ink is configured to be replenished to an ink containing portion that contains ink in an open state of the second cover, and the first operation portion is disposed at one side of the housing in the horizontal direction, and the second operation portion is disposed at the other side of the housing in the horizontal direction.

28. The printer according to claim 1 further comprising:

a housing that houses the photosensitive drum and the recording head; and a cover configured to open and close an opening formed in the housing, wherein the recording head includes a recording head configured to eject ink onto the sheet, and an ink containing portion that contains ink to be supplied to the recording head, and ink is replenishable to the ink containing portion in an open state of the cover.

29. The printer according to claim 28, wherein the ink containing portion includes an ink cartridge that is attachable and detachable through the opening.

30. The printer according to claim 1 further comprising:

an upper face cover that constitutes an upper face of the housing for housing the photosensitive drum and the recording head and is configured to be moved between a first position where a path along which the sheet on which the image is recorded by the recording head is conveyed is exposed and a second position where the path is covered.

31. A printer comprising:

an image forming unit configured to form an image on a sheet by an electrophotographic method; and a recording unit configured to record an image on a sheet by an inkjet method, wherein an image recording position of the recording unit is located above an image forming position of the image forming unit, the image forming unit is configured to form the image on the sheet conveyed along a first path, the recording unit is configured to record the image on the sheet conveyed along a second path, the printer further comprises a reserve roller that is provided on the first path, disposed downstream of the image forming unit in a conveyance direction, configured to convey the sheet to both a downstream side and an upstream side in the conveyance direction, the side path is connected to the second path at a connection position between the image forming unit and the reserve roller on the first path, the reserve roller is configured to convey the sheet to the downstream side in the conveyance direction and then convey the sheet to the upstream side in the conveyance direction so as to convey the sheet to the second path, and the image recording position of the recording unit is located above the reserve roller.

32. A printer comprising:

a photosensitive drum on which a toner image to be transferred onto a sheet is formed on a face of the photosensitive drum; and a recording head configured to eject ink onto a sheet, wherein the recording head is located above the photosensitive drum, the photosensitive drum is configured to form the image on the sheet conveyed along a first path, the recording head is configured to record the image on the sheet conveyed along a second path, the printer further comprises a reverse roller that is provided on the first path, disposed downstream of the photosensitive drum in a conveyance direction, configured to convey the sheet to both a downstream side and an upstream side in the conveyance direction, the first path is connected to the second path at a connection position between the photosensitive drum and the reverse roller on the first path, the reverse roller is configured to convey the sheet to the downstream side in the conveyance direction and then convey the sheet to the upstream side in the conveyance direction so as to convey the sheet to the second path, the first path is connected to a return path at a position between the photosensitive drum and the reverse roller on the first path, and the return path is a path for returning the sheet to a position upstream of the photosensitive drum on the first path, and the reverse roller conveys the sheet to the return path by conveying the sheet to the upstream side in the conveyance direction based on a determination that a trailing end of the sheet is located at a first position on the first path, or the second path by conveying the sheet to the upstream side in the conveyance direction based on a determination that a trailing end of the sheet is located at a second position that is a position different from the first position on the first path.

* * * * *